(12) United States Patent
Mori et al.

(10) Patent No.: US 6,334,306 B1
(45) Date of Patent: Jan. 1, 2002

(54) EXHAUST GAS PURIFICATION APPARATUS IN COMBUSTION ENGINE

(75) Inventors: Kouichi Mori; Ritsuo Sato; Kimiyoshi Nishizawa, all of Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/321,825

(22) Filed: May 28, 1999

(30) Foreign Application Priority Data

May 29, 1998 (JP) .......................................... 10-150274

(51) Int. Cl.⁷ ................................................. F01N 3/00
(52) U.S. Cl. ............................ 60/297; 60/299; 60/302
(58) Field of Search .......................... 60/297, 299, 302, 60/295

(56) References Cited

U.S. PATENT DOCUMENTS

| | | | | |
|---|---|---|---|---|
| 5,307,627 A | * | 5/1994 | Christensen et al. | 60/297 |
| 5,398,503 A | * | 3/1995 | Danno et al. | 60/297 |
| 5,499,501 A | * | 3/1996 | Kato et al. | 60/302 |
| 5,634,332 A | * | 6/1997 | Tanaka et al. | 60/297 |
| 5,647,203 A | * | 7/1997 | Abe et al. | 60/297 |
| 5,662,869 A | * | 9/1997 | Abe et al. | 60/297 |
| 5,761,902 A | * | 6/1998 | Usami et al. | 60/297 |
| 5,765,369 A | * | 6/1998 | Tanaka et al. | 60/297 |
| 5,766,559 A | * | 6/1998 | Blanchet et al. | 60/285 |
| 5,881,553 A | * | 3/1999 | Steenackers et al. | 60/299 |
| 5,939,028 A | * | 8/1999 | Bennett et al. | 60/299 |
| 5,950,423 A | * | 9/1999 | Hampton | 60/302 |
| 6,000,217 A | * | 12/1999 | Hochmuth | 60/297 |
| 6,051,040 A | * | 4/2000 | Peter-hoblyn | 123/1 A |

FOREIGN PATENT DOCUMENTS

| | | |
|---|---|---|
| JP | 7-144119 | 6/1995 |
| JP | 7-174017 | 7/1995 |

* cited by examiner

*Primary Examiner*—Thomas Denion
*Assistant Examiner*—Diem Tran
(74) *Attorney, Agent, or Firm*—Foley & Lardner

(57) ABSTRACT

A three-way catalytic converter 42 and a combined catalytic-hydrocarbon adsorbent 43 are arranged in an exhaust manifold 32 of an engine 11. The three-way catalytic converter 42 and the combined catalytic-hydrocarbon adsorbent 43 are arranged adjacent to each other in series from an upstream. A pulsing stream of the exhaust gas is kept strong at the point where combined catalytic-hydrocarbon adsorbents 42 are arranged. Thus, hydrocarbons desorbed from the combined catalytic-hydrocarbon adsorbents 42 are strongly affected by an action of a pulsing stream of the exhaust gas, and hydrocarbons desorbed from the combined catalytic-hydrocarbon adsorbent 43 flow backward in the direction of the three-way catalytic converter 42. Consequently, hydrocarbons desorbed from the combined catalytic-hydrocarbon adsorbent 43 are given a chance to contact with the three-way catalytic converter 42 again, and are oxidized with the three-way catalytic converter 42.

39 Claims, 19 Drawing Sheets

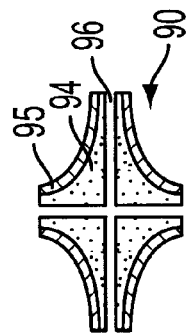
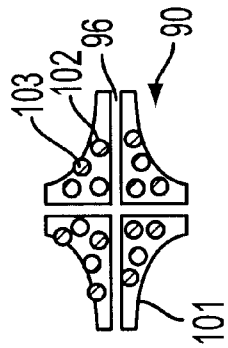
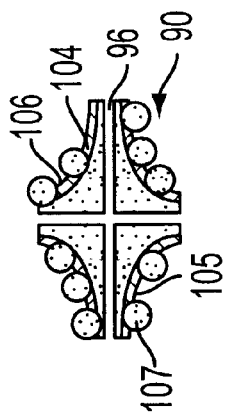
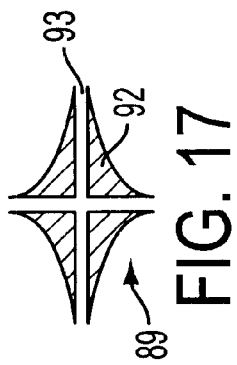
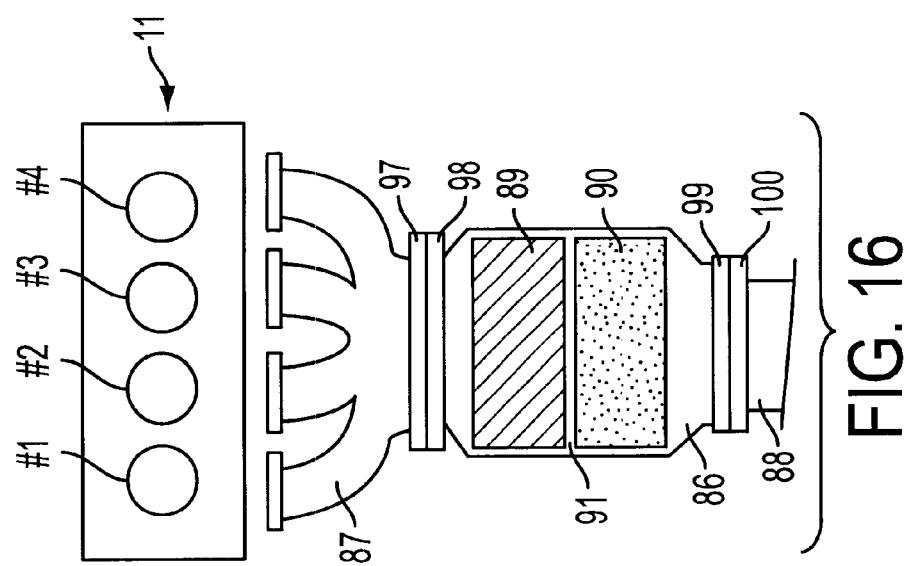

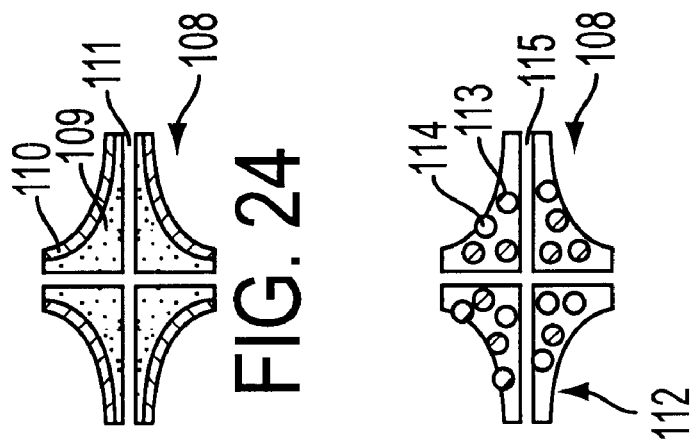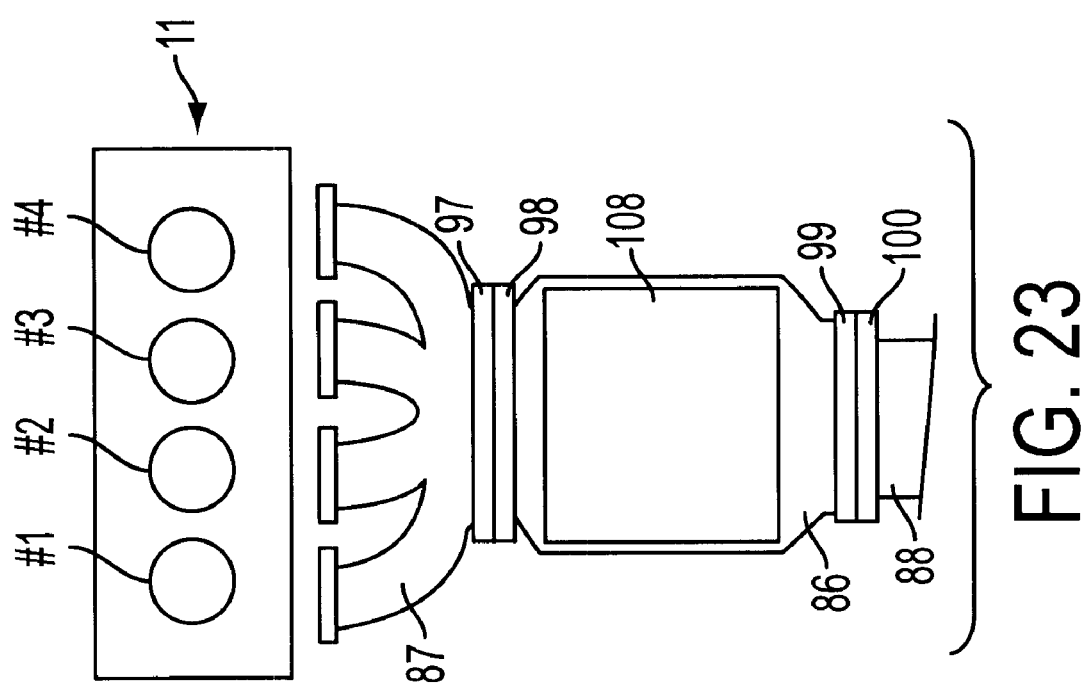

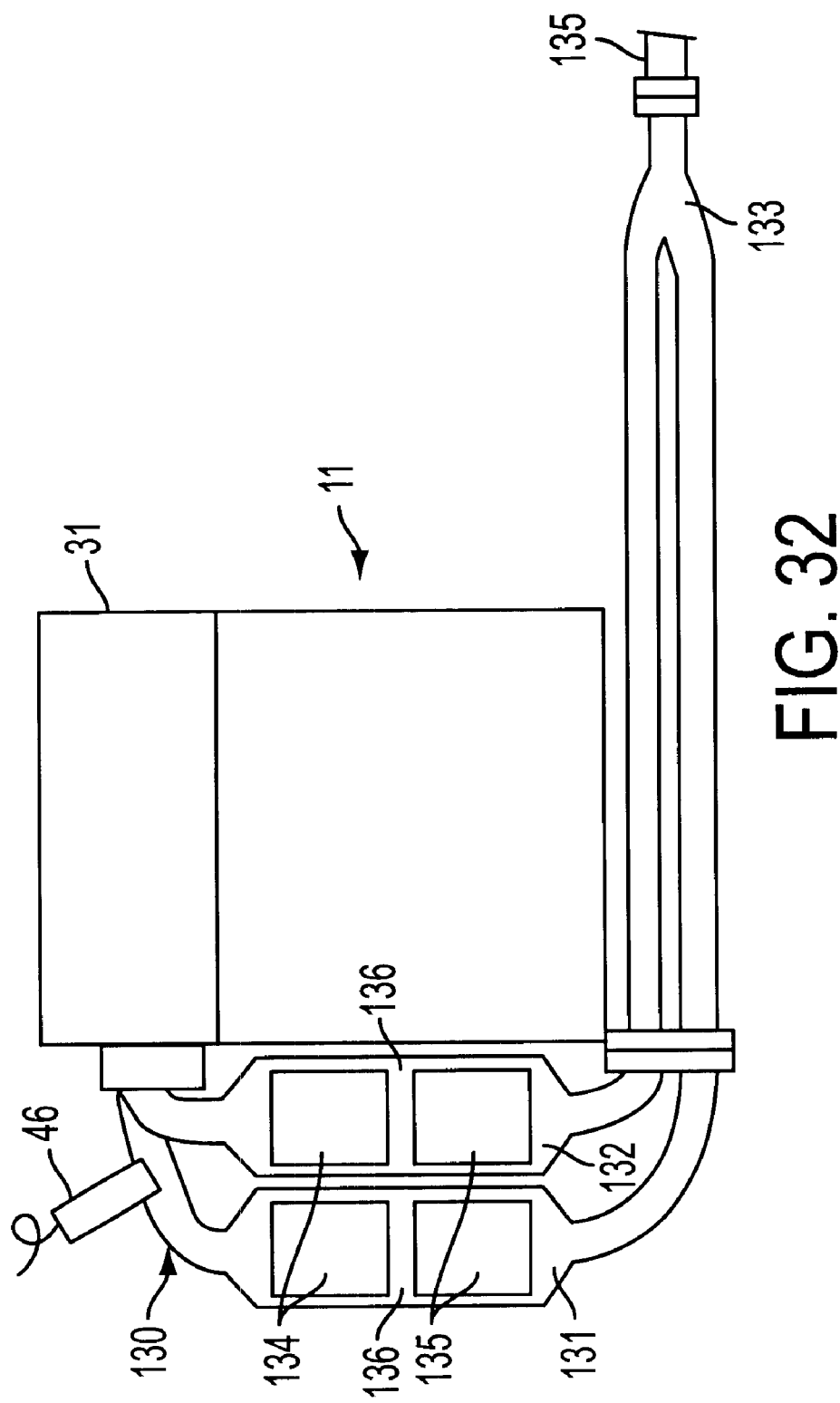

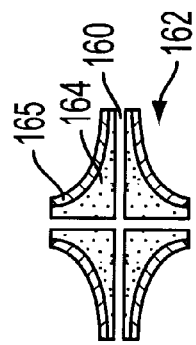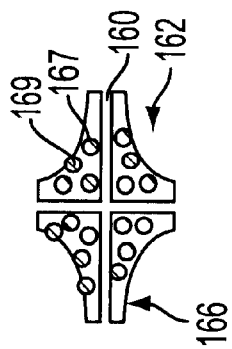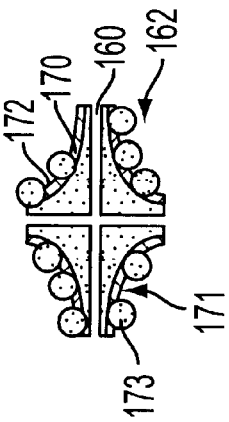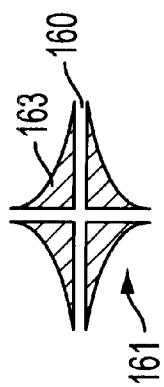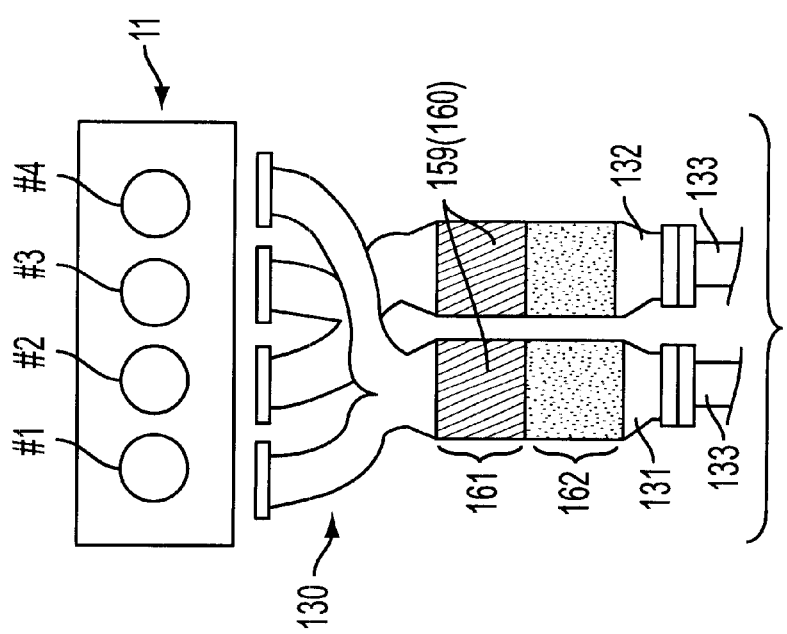

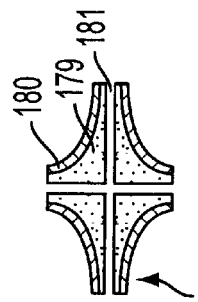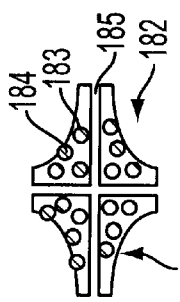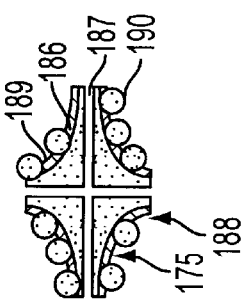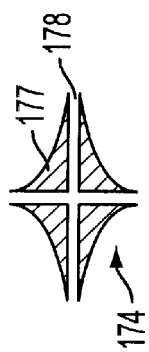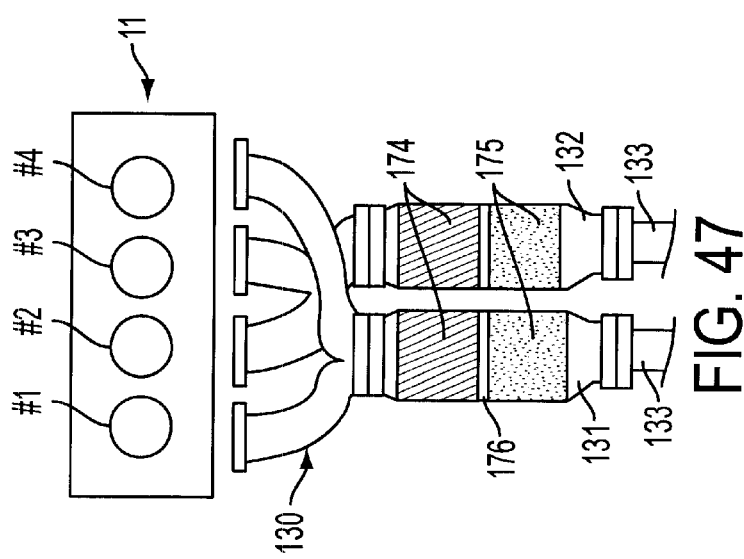

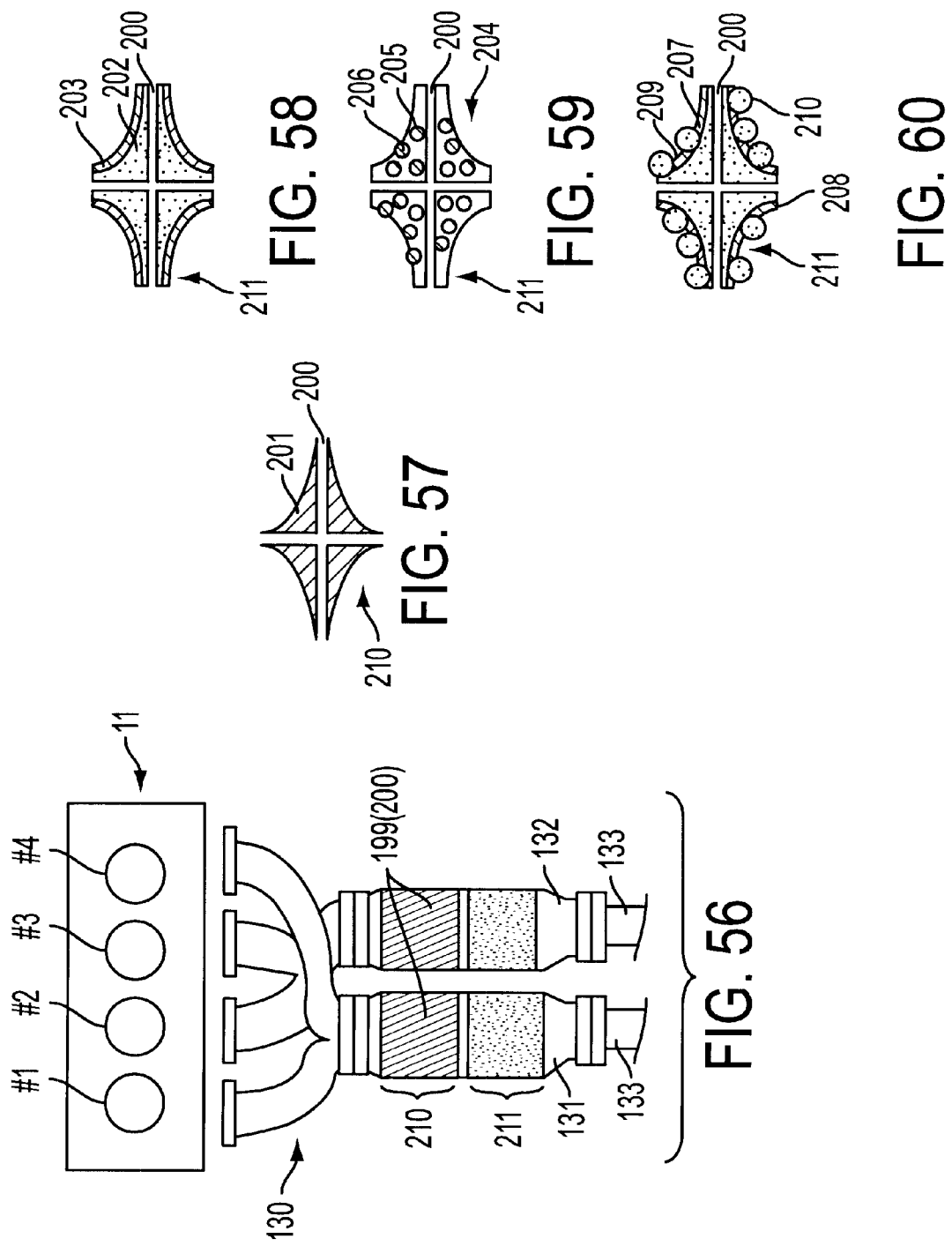

EXHAUST GAS PURIFICATION APPARATUS IN COMBUSTION ENGINE

BACKGROUND OF THE INVENTION

1. Field of the Invention

This invention relates to an exhaust gas purification apparatus in a combustion engine, including a hydrocarbon adsorbent and a catalytic converter.

2. Description of the Related Art

As discussed in Japanese Patent Application Laid-open No. 95/144,119, in order to purify hydrocarbons discharged from a combustion engine, a three-way catalytic converter and an integrated catalytic converter, which is an integration of a hydrocarbon adsorbent and a three-way catalyst, are disposed in an exhaust passage of the combustion engine so that the three-way catalytic converter and the integrated catalytic converter are arranged adjacent to each other in series at a location under a floor-panel of a vehicle.

Also, in order to purify hydrocarbons, Japanese Patent Application Laid-open No. 95/174,017 discloses a pre-three-way catalytic converter provided in an exhaust manifold, and a three-way catalytic converter and an integrated catalytic converter provided in an exhaust passage which is connected to downstream the exhaust manifold. Similar to the foregoing related art, the three-way catalytic converter and the integrated catalytic converter are arranged adjacent to each other in series at a location under a floor-panel of a vehicle.

SUMMARY OF THE INVENTION

With such an exhaust gas purification apparatus, the hydrocarbon adsorbent in the integrated catalytic converter is generally capable of adsorbing hydrocarbons at a lower temperature such as during the start-up period of the combustion engine. Therefore, hydrocarbons discharged from the combustion engine are adsorbed in the integrated catalytic converter when a three-way catalyst employed therein has not been activated.

Now, a desorbing temperature of the hydrocarbon adsorbent is generally lower than an activation temperature of the three-way catalyst. Thus, during the period after reaching to the desorbing temperature until the activation temperature is reached, there may be a possibility that a part of the hydrocarbons desorbed from the hydrocarbon adsorbent can be discharged into the atmosphere without being oxidized with the three-way catalyst.

On the other hand, the hydrocarbon adsorbent naturally desorbs hydrocarbons at a stretch when a temperature of the hydrocarbon adsorbent has exceeded the desorbing temperature. Consequently, an air-fuel ratio at the hydrocarbon adsorbent shifts to the rich side, and the three-way catalyst cannot oxidize hydrocarbons effectively because the three-way catalyst fulfills its function under a certain air fuel ratio, that is, the stoichiometric ratio. Thus, there is also a possibility even after activation of the three-way catalyst that a part of the hydrocarbons desorbed from the hydrocarbon adsorbent can be discharged into the atmosphere without being oxidized.

It was therefore an object of this invention to provide an exhaust gas purification apparatus in a combustion engine which can decrease the amount of hydrocarbons discharged to the atmosphere without oxidizing the three-way catalyst or oxidize catalytic.

In order to achieve the above object as well as other objects, this invention provides an exhaust gas purification apparatus in a combustion engine comprising an exhaust manifold of an engine, a hydrocarbon adsorbent that adsorbs hydrocarbon at a lower temperature, and that desorbs hydrocarbon at a higher temperature. The adsorbent is disposed in the exhaust manifold, and a catalytic converter that purifies hydrocarbon is also disposed in the exhaust manifold at a position upstream from the adsorbent. Further the catalytic converter and the hydrocarbon adsorbent are arranged adjacent to each other in series.

These and other objects and many of the attendant advantages of this invention will be readily appreciated as the same become better understood by reference to the following detailed description when considered in connection with the accompanying drawing.

BRIEF DESCRIPTION OF THE DRAWINGS

FIG. 16 illustrates a partial schematic view of an exhaust gas purification apparatus in a multi-cylinder internal combustion engine, of another preferred embodiment of this invention.

FIG. 17 illustrates a portion of a three-way catalytic converter, on an enlarged scale, in view of exhaust gas flow.

FIG. 18 illustrates a portion of a combined catalytic-hydrocarbon adsorbent, on an enlarged scale, in view of exhaust gas flow.

FIG. 19 illustrates a portion of a combined catalytic-hydrocarbon adsorbent showing another modification, on an enlarged scale, in view of exhaust gas flow.

FIG. 20 illustrates a portion of a combined catalytic-hydrocarbon adsorbent showing further another modification, on an enlarged scale, in view of exhaust gas flow.

FIG. 23 is a partial schematic view of an exhaust gas purification apparatus in a multi-cylinder internal combustion engine, of another preferred embodiment of this invention.

FIG. 24 illustrates a portion of a combined catalytic-hydrocarbon adsorbent, on an enlarged scale, in view of exhaust gas flow.

FIG. 25 illustrates a portion of a combined catalytic-hydrocarbon adsorbent showing another modification, on an enlarged scale, in view of exhaust gas flow.

FIG. 32 is a partial schematic view of an exhaust gas purification apparatus in a multi-cylinder internal combustion engine, of another preferred embodiment of this invention.

FIG. 42 is a partial schematic view of an exhaust gas purification apparatus in a multi-cylinder internal combustion engine, of another preferred embodiment of this invention.

FIG. 43 illustrates a portion of a three-way catalytic converter, on an enlarged scale, in view of exhaust gas flow.

FIG. 44 illustrates a portion of a combined catalytic-hydrocarbon adsorbent, on an enlarged scale, in view of exhaust gas flow.

FIG. 45 illustrates a portion of a combined catalytic-hydrocarbon adsorbent showing another modification, on an enlarged scale, in view of exhaust gas flow.

FIG. 46 illustrates a portion of a combined catalytic-hydrocarbon adsorbent showing further another modification, on an enlarged scale, in view of exhaust gas flow.

FIG. 47 is a partial schematic view of an exhaust gas purification apparatus in a multi-cylinder internal combustion engine, of another preferred embodiment of this invention.

FIG. 48 illustrates a portion of a three-way catalytic converter, on an enlarged scale, in view of exhaust gas flow.

FIG. 49 illustrates a portion of a combined catalytic-hydrocarbon adsorbent, on an enlarged scale, in view of exhaust gas flow.

FIG. 50 illustrates a portion of a combined catalytic-hydrocarbon adsorbent showing another modification, on an enlarged scale, in view of exhaust gas flow.

FIG. 51 illustrates a portion of a combined catalytic-hydrocarbon adsorbent showing further another modification, on an enlarged scale, in view of exhaust gas flow.

FIG. 56 is a partial schematic view of an exhaust gas purification apparatus in a multi-cylinder internal combustion engine, of another preferred embodiment of this invention.

FIG. 57 illustrates a portion of a three-way catalytic converter, on an enlarged scale, in view of exhaust gas flow.

FIG. 58 illustrates a portion of a combined catalytic-hydrocarbon adsorbent, on an enlarged scale, in view of exhaust gas flow.

FIG. 59 illustrates a portion of a combined catalytic-hydrocarbon adsorbent showing another modification, on an enlarged scale, in view of exhaust gas flow.

FIG. 60 illustrates a portion of a combined catalytic-hydrocarbon adsorbent showing further another modification, on an enlarged scale, in view of exhaust gas flow.

DETAILED DESCRIPTION OF PREFERRED EMBODIMENTS

First Embodiment

The present invention will now be described by way of preferred embodiments in connection with the accompanying drawings.

Figure 1:
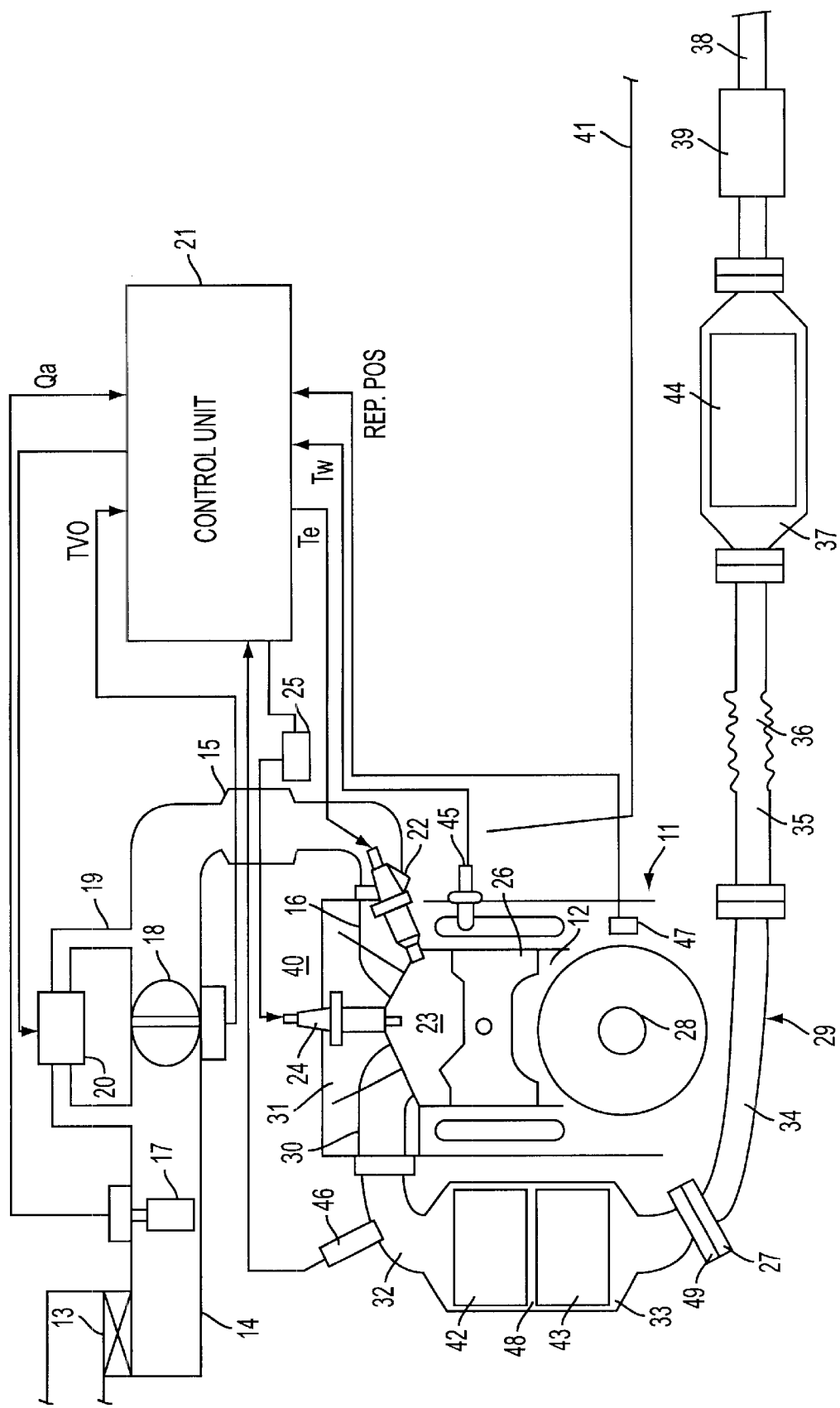
FIG. 1 is a schematic diagram of an exhaust gas purification apparatus in a multi-cylinder internal combustion engine for a vehicle.

FIG. 1 illustrates an exhaust gas purification apparatus in a multi-cylinder internal combustion engine 11 for a vehicle.

Intake air supplying to a cylinder 12 passes from an air cleaner 13 through an intake passage 14, an intake manifold 15 and an intake port 16. An air flow meter 17 is provided to measure an intake air amount. Intake air quantity is controlled by a throttle valve 18, which is provided in the intake passage 14 on the downstream side of the air flow meter 17. A supplementary air passage 19 having a supplementary air valve 20 is installed to the intake passage 14. The supplementary air valve 20 is provided to adjust an amount of supplementary air bypassing the throttle valve 18 according to a driving signal from a control unit 21.

A fuel injector 22 is provided in each cylinder 12 so as to inject fuel directly into a combustion chamber 23. The fuel injector 22 injects fuel when its solenoid receives a fuel injection pulse signal Te outputted from the control unit 21. Fuel injected from the fuel injector 22 mixes with intake air in the combustion chamber 23 and forms an air-fuel mixture. Instead of disposing the fuel injector 22 in each cylinder 12, as another variation, the fuel injector can be disposed in each intake port 16, or only one fuel injector can be disposed in the upstream side of the intake manifold 15.

Figure 2:
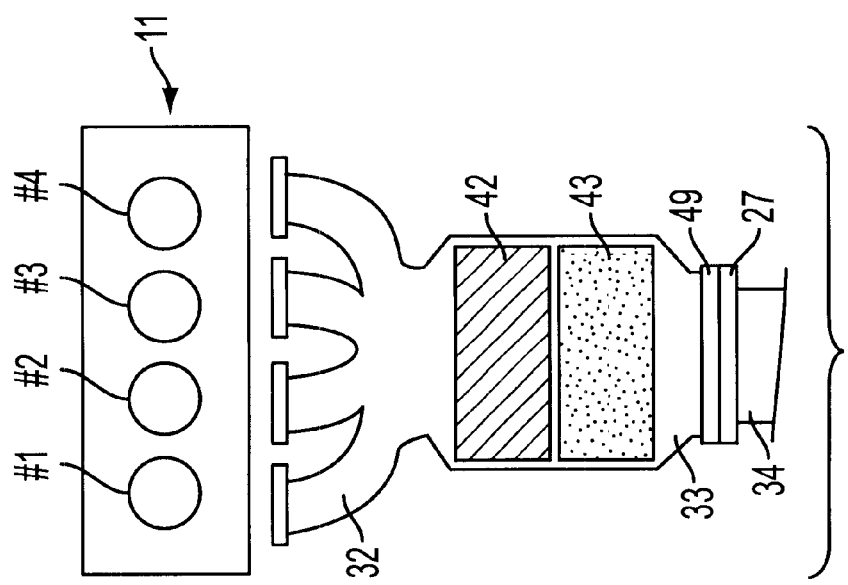
FIG. 2 is a partial schematic view of an exhaust gas purification apparatus in a multi-cylinder internal combustion engine, of preferred embodiment of this invention.

A spark plug 24 is mounted on the center of each cylinder 12. The spark plug 24 ignites air-fuel mixture when an ignition circuit 25 receives an ignition signal outputted from the control unit 21. Identifying the cylinder number as shown in FIG. 2, in a four-cylinder engine, ignition occurs in the order of #1, #3, #4 and #2.

A piston 26 reciprocates in the cylinder 12 by burning the air-fuel mixture, and a connecting rod (not shown) converts the reciprocation of the piston 26 into a rotation of a crankshaft 28.

An exhaust passage 29 is defined as a passage extending from an exhaust port 30 in a cylinder head 31, an exhaust manifold 32 having a pre-converter container 33, a front tube 34, a center tube 35 having a flexible tube 36, a converter container 37, and tail tube 38 having a silencer 39. The front tube 34 is provided under the engine 11. In other word, the front tube 34 is provided in an engine room 40 of a vehicle. The center tube 35 and the tail tube 38 are provided under a floor-panel 41 of the vehicle.

An exhaust gas due to combustion is discharged into atmosphere through a three-way catalytic converter 42, a combined catalytic-hydrocarbon adsorbent 43 and an under-floor three-way catalytic converter 44.

The three-way catalytic converter 42 and the combined catalytic-hydrocarbon adsorbent 43 are disposed in the pre-converter container 33 of the exhaust manifold 32. In other words, a part of the exhaust manifold 32 functions as the pre-converter container 33 for the three-way catalytic converter 42 and the combined catalytic-hydrocarbon adsorbent 43. The under-floor three-way catalytic converter 44 is disposed in the converter container 37. The three-way catalytic converter 42, the combined catalytic-hydrocarbon adsorbent 43, and the under-floor three-way catalytic converter 44 will be explained in detail later.

The control unit 21, or controller, includes a microcomputer comprised of a CPU, a ROM, a RAM, an A/D converter, and an input/output interface. The control unit 21 receives signals fed thereto from various sensors, and built therein for making calculations at least described herein.

As various sensors, which includes the air flow meter 17 for detecting an intake airflow rate Qa, a coolant temperature sensor 45 for detecting a coolant temperature Tw of the engine 11 and an O2 sensor 46 provided in the exhaust manifold 32 at a position upstream of the three-way catalytic converter 42. The O2 sensor 46 produces a signal corresponding to the rich/lean composition of the exhaust gas inversely for an actual airfuel ratio determination. In stead of using the O2 sensor 46, an air-fuel ratio sensor producing a signal corresponding to the actual air-fuel ratio of the exhaust gas can be applied.

Various sensors also include an angle sensor 47 for detecting a rotation of the crankshaft 28. The angle sensor 47 produces a reference pulse signal REF and a unit pulse signal POS. The reference pulse signal REF is outputted at every 720 degrees/n of rotation of the crankshaft 28, where n is the number of cylinders. For example, in a four-cylinder engine, the REF is output at every 180 degrees of rotation of the crankshaft. The unit pulse signal POS is outputted at every 1 degree of rotation of the crankshaft 28. The control unit 21 calculates an engine rotation Ne based on the signal outputted from the angle sensor 47.

The control unit 21 calculates an injection pulse width Te outputted to the fuel injector 22 based on engine operation conditions including the intake airflow rate Qa, the engine rotation speed Ne, the coolant temperature Tw and the signal detected by the O2 sensor. Also, the control unit 21 calculates ignition timing based on engine operating conditions including the injection pulse width Te and an engine rotation speed Ne.

The injection pulse width Te [msec] is calculated as follows.

Firstly, calculating a basic injection pulse width Tp [msec] by the following equation (1) from the intake airflow rate Qa [g/sec], and the engine rotation speed Ne [rpm].

$$Tp=Qa/Ne \cdot K \tag{1}$$

where, K=Constant.

Then, the injection pulse width Te [msec] is found by the next equation (2).

$$Te=Tp \cdot Tfbya \cdot ALPHA+Ts \tag{2}$$

where, Tfbya=target fuel-air ratio equivalent amount [absolute number],

ALPHA=air-fuel ratio feedback correction coefficient [%],

Ts=Ineffectual pulse width [msec].

The target fuel-air ratio equivalent amount Tfbya is a sum of, a coolant temperature correction coefficient Kw, a post-startup correction coefficient Kas and a target fuel-air ratio Dml. The coolant temperature correction coefficient Kw is calculated based on the coolant temperature Tw.

Now, when performing an air-fuel ratio feedback control where the target air-fuel ratio is stoichometric, the target fuel-air ratio equivalent amount TJbya takes a value 1.0.

When the engine 11 is operated in a cold start-up condition, to stabilize a rotation of the engine 11 by increasing fuel amount, the target fuel-air ratio equivalent amount Tifbya takes a value greater than 1.0 by increasing the value of the coolant temperature correction coefficient Kw and the post-startup correction coefficient Kas.

When the engine 11 is in a lean burn condition, or when the combined catalytic-hydrocarbon adsorbent desorbs hydrocarbons, the engine 11 runs on a lean air-fuel ratio by decreasing a value of the target fuel-air ratio Dml.

On the other hand, when the air-fuel ratio feedback control is performed, the air-fuel ratio feedback correction coefficient ALPHA takes a value based on the output of the O2 sensor by proportional integral control. Immediately after the air-fuel ratio has inverted from rich to lean, the air-fuel ratio feedback correction coefficient ALPHA is calculated by the following equation (3).

$$ALPHA=ALPHA (old)+PL \tag{3}$$

where, ALPHA (old)=immediately preceding value of ALPHA,

PL=proportional part when the air-fuel ratio is corrected to rich by PI control.

When the air-fuel ratio has not inverted, in other words, the lean air-fuel ratio persists, the air-fuel ratio feedback correction coefficient ALPHA is calculated by adding IL to the immediately preceding value ALPHA (old) by the following equation (4).

$$ALPHA=ALPHA (old)+IL \tag{4}$$

where, IL=an integral part when the air fuel is corrected to rich by PI control.

On the other hand, immediately after the air-fuel ratio has inverted from lean to rich, the air-fuel ratio feedback correction coefficient ALPHA is calculated by the following equation (5).

$$ALPHA=ALPHA (old)-PR \tag{5}$$

where, ALPHA(old)=immediately preceding value of ALPHA,

PR=proportional part when the air-fuel ratio is corrected to lean by PI control.

When the air-fuel ratio has not inverted, in other words, the rich air fuel ratio persists, the air-fuel ratio feedback correction coefficient ALPHA is calculated by deducting IR from the immediately preceding value ALPHA (old) by the following equation (6).

$$ALPHA=ALPHA (old)-IR \tag{6}$$

where, IR=an integral part when the air fuel is corrected to lean by PI control.

The under-floor three-way catalytic converter 44 disposed in the converter container 37 is provided at a location under the floor-panel 41 of the vehicle. The under-floor three-way catalytic converter 44 performs oxidation of hydrocarbons (HC) and carbon monoxide (CO), and reduction of nitrogen oxides (NOx) at a certain air-fuel ratio, that is, stoichometric. The under-floor three-way catalytic converter 44 includes at least one precious metal of platinum (Pt), Rhodium (Rh) and Palladium (Pd).

The three-way catalytic converter 42 and the combined catalytic-hydrocarbon adsorbent 43 are arranged adjacent to each other in series so as to take a predetermined small space 48. In other words, the three-way catalytic converter 42 is arranged at a position immediately upstream from the combined catalytic-hydrocarbon adsorbent 43. As a variation, no space between the three-way catalytic converter 42 and the combined catalytic-hydrocarbon adsorbent 43 is applicable. As another variation, an oxidation catalytic converter can be applied instead of the three-way catalytic converter 42.

As also shown in FIG. 2, the pre-converter container 33 is defined in the exhaust manifold 32, and the combination of the three-way catalytic converter 42 and the combined catalytic-hydrocarbon adsorbent 43 is installed at immediately downstream of the point where exhaust gas discharged from each cylinder get together.

In addition, since a flange 49 of the exhaust manifold 32 coupled to a flange 27 of the front tube 34 is arranged at downstream of the three-way catalytic converter 42, a heat-mass of the exhaust manifold 32 on the upstream side of the three-way catalytic converter 42 is reduced. Thus, the three-way catalytic converter 42 can reach its activation temperature quickly in the start-up period of the engine 11.

The three-way catalytic converter 42 preferably includes palladium (Pd) for light off catalytic conversion. Also, as precious metal, platinum (Pt) and Rhodium (Rh) are applicable. The three-way catalytic converter 42 performs oxidation of hydrocarbons (HC) and carbon monoxide (CO), and reduction of nitrogen oxides (NOx) at a certain air-fuel ratio, that is, stoichometric.

Figure 3:
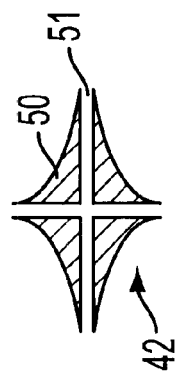
FIG. 3 illustrates a portion of a three-way catalytic converter, on an enlarged scale, in view of exhaust gas flow.

FIG. 3 shows a part of the three-way catalytic converter 42 (catalytic converter) on enlarged scale in view of exhaust gas flow. A three-way catalytic layer 50 (three-way catalyst) carrying precious metal is layered on a honeycomb substratum 51 (base). As a precious metal, at least one of platinum (Pt), Rhodium (Rh) and Palladium (Pd) can be used. Preferably the honeycomb substratum 51 is made of a kind of metal for rapidly temperature rising in the start-up period of the engine 11.

The combined catalytic-hydrocarbon adsorbent converter 43 (hydrocarbon adsorbent) has capability of adsorbing hydrocarbons at a lower temperature such as the start-up period of the combustion engine, and desorbing hydrocarbons at a higher temperature for example 150° C.~200° C. Also, The combined catalytic-hydrocarbon adsorbent converter 43 has a capability, after reaching its activation temperature for example 250° C., of oxidizing hydrocarbons (HC) and carbon monoxide (CO), and reducing nitrogen oxides (NOx) at stoichometric air-fuel ratio.

Figure 4:
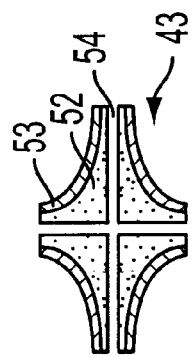
FIG. 4 illustrates a portion of a combined catalytic-hydrocarbon adsorbent, on an enlarged scale, in view of exhaust gas flow.

FIG. 4 shows a part of the combined catalytic-hydrocarbon adsorbent 43 on enlarged scale in view of exhaust gas flow. A hydrocarbon adsorbent layer 52 (hydrocarbon adsorber) consists of zeolite for an under layer and a three-way catalytic layer 53 (three-way catalyst) carrying precious metal for an over layer are layered on a cordierite honeycomb substratum 54 (base). As a zeolite, USY, B-Zeolite or ZSM-5 can be used. As a precious metal, at least one of platinum (Pt), Rhodium (Rh) and Palladium (Pd) can be used. The hydrocarbon adsorbent layer 52 adsorbs hydrocarbons at a lower temperature, and desorbs hydrocarbons at a higher temperature. The three-way catalytic layer 53 oxidizes hydrocarbons (HC) and carbon monoxide (CO), and reduces nitrogen oxides (NOx) at the same time under stoichometric air-fuel ratio. In general, a desorbing temperature of hydrocarbon adsorbent layer 52 is lower than an activation temperature of the three-way catalytic converter 42, the three-way catalytic layer 53 or under-floor three-way catalytic converter 44.

Now, the engine 11 is started, hydrocarbons discharged from the combustion chamber 23 are adsorbed in the combined catalytic-hydrocarbon adsorbent 43 until the temperature of the combined catalytic-hydrocarbon adsorbent 43 reaches the desorbing temperature thereof. Thus, the amount of hydrocarbons discharged into atmosphere can be reduced, even though the three-way catalytic converter 42, the three-way catalytic layer 53 and the under-floor three-way catalytic converter 44 have not activated.

As discussed above, the desorbing temperature of the hydrocarbon adsorbent layer 52 is lower than the activation temperature of the three-way catalytic layer 53 in the combined catalytic-hydrocarbon adsorbent converter 43. Thus, when the temperature of the combined catalytic-hydrocarbon adsorbent converter 43 reaches its desorbing temperature, the three-way catalytic layer 53 in the combined catalytic-hydrocarbon adsorbent converter 43 has not activated yet. Of course, at this time, the under-floor three-way catalytic converter 44, which is arranged at downstream of the exhaust passage 29, has not activated yet. However, with this exhaust gas purification apparatus, the combination of the three-way catalytic converter 42 and the combined catalytic-hydrocarbon adsorbent 43 is installed immediately downstream of the point where exhaust gas discharged from each cylinder get together. Thus, hydrocarbons desorbed from the hydrocarbon adsorbent layer 52 are affected by an action of a strong pulsing stream of the exhaust gas.

Figure 7:
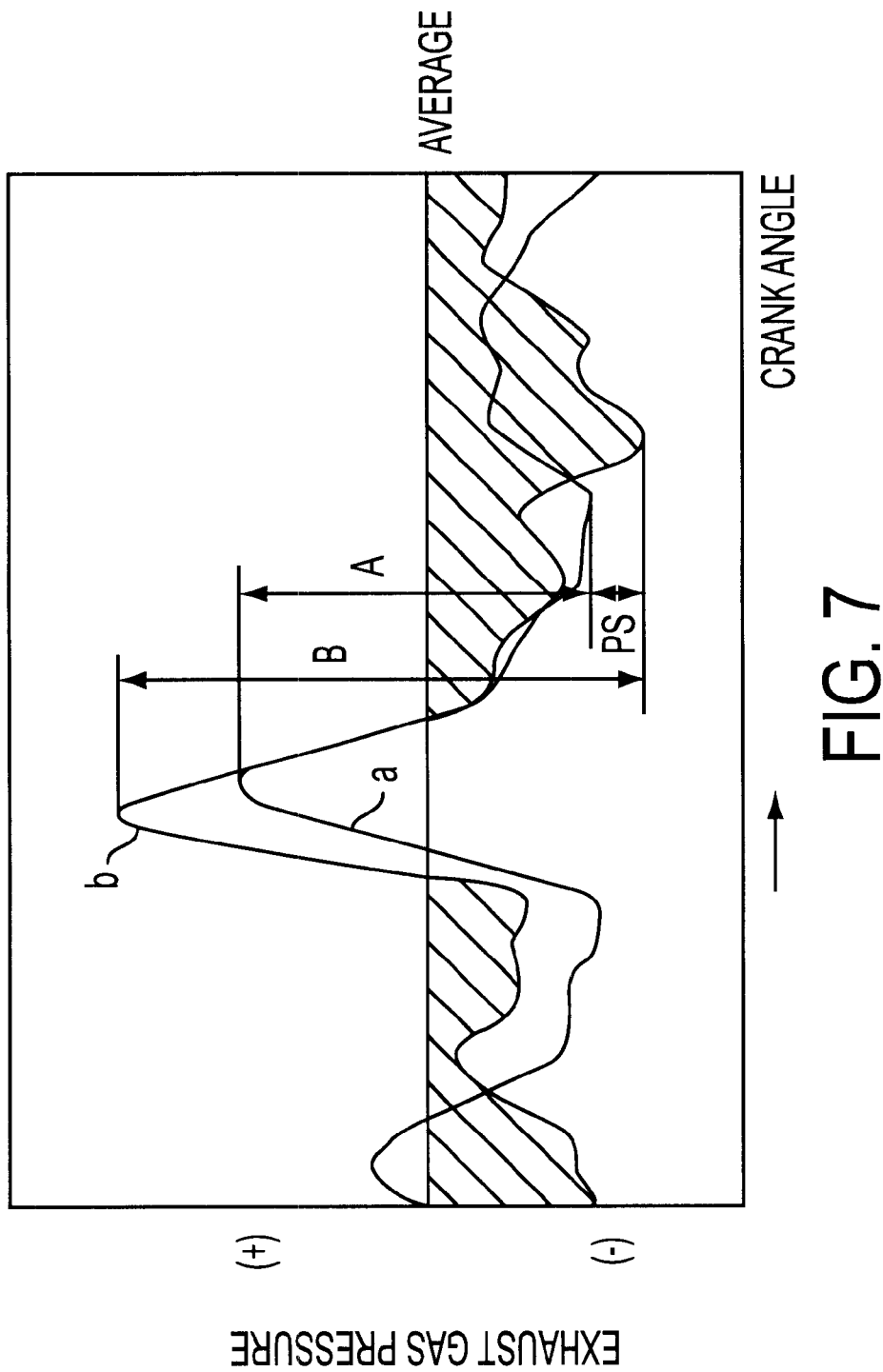
FIG. 7 is a graphical diagram illustrating an exhaust gas pressure, at a combined catalytic-hydrocarbon adsorbent, with respect to an elapsed time.

Referring to FIG. 7, line (a) shows an exhaust gas pressure at the combined atalytic-hydrocarbon adsorbent 43. The exhaust gas pressure at the combined catalytic-hydrocarbon adsorbent 43 changes inversely from plus side to minus side for the average of he exhaust gas pressure. Moreover, the three-way catalytic converter 42 and the combined catalytic-hydrocarbon adsorbent 43 are arranged adjacent to each other. Thus, when the exhaust gas pressure shifts minus side, hydrocarbons desorbed from the hydrocarbon adsorbent layer 52 flow backward in the direction of the three-way catalytic converter 42. Then hydrocarbons flowed backward by the action of the strong pulsing stream of the exhaust gas come in contact with the three-way catalytic layer 53 of the three-way catalytic converter 42 again.

In addition, as the three-way catalytic converter 42 is disposed nearer to the combustion chamber 23 than the combined catalytic-hydrocarbon adsorbent 43, the three-way catalytic converter 42 can reach its activation temperature before the hydrocarbon adsorbent layer 53 starts to desorb hydrocarbons. Further, as the three-way catalytic converter 42 is formed separately from the combined catalytic-hydrocarbon adsorbent 43, the temperature of the three-way catalytic converter 42 rises quickly. Further more, the three-way catalytic converter 42 includes palladium for light off catalytic conversion, the three-way catalytic converter 42 activates in a short time.

Thus, since the three-way catalytic converter 42 has already been activated enough when the combined catalytic-hydrocarbon adsorbent 43 starts to desorb hydrocarbons, hydrocarbons desorbed from the combined catalytic-hydrocarbon adsorbent 43 are oxidized with the three-way catalytic converter 42 effectively.

In case of using the oxidation catalytic converter instead of the three-way catalytic converter 42, hydrocarbons desorbed from the combined catalytic-hydrocarbon adsorbent 43 are oxidized with the oxidation catalytic converter.

Further, since no catalytic converter or hydrocarbon adsorbent is disposed upstream of the three-way catalytic converter 42, the pulsing stream of the exhaust gas is kept strong at the combination of the three-way catalytic converter 42 and the combined catalytic-hydrocarbon adsorbent 43. Thus, hydrocarbons desorbed from the combined catalytic-hydrocarbon adsorbent 43 flow backward effectively in the direction of the three-way catalytic converter 42, and are oxidized with the three-way catalytic converter 42 efficiently.

Here, the pulsing stream of the exhaust gas attenuates by going away from the point where exhaust gathers to the downstream side of the exhaust passage 29. Also, the pulsing stream of the exhaust gas attenuates by passing through the three-way catalytic converter or the combined catalytic-hydrocarbon adsorbent. Therefore, a strong pulsing stream is not obtained at the point, where the under-floor three-way catalytic converter 44 is disposed, and the oxidization of hydrocarbons by using the pulsing stream of exhaust gas cannot be expected.

Figure 5:
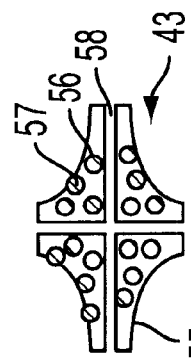
FIG. 5 illustrates a portion of a combined catalytic-hydrocarbon adsorbent showing another modification, on an enlarged scale, in view of exhaust gas flow.

FIG. 5 illustrates another modification of the combined catalytic-hydrocarbon adsorbent 43. A catalytic-adsorbent layer 55, where a hydrocarbon adsorber 56 consisting of zeolite is mixed with a three-way catalyst 57 carrying precious metal, is layered on a cordierite honeycomb substratum 58.

Figure 6:
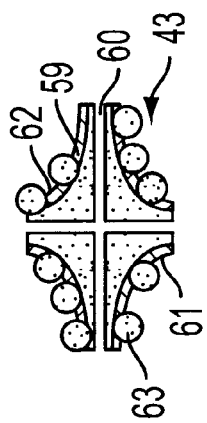
FIG. 6 illustrates a portion of a combined catalytic-hydrocarbon adsorbent showing another modification, on an enlarged scale, in view of exhaust gas flow.

FIG. 6 illustrates further another modification of the combined catalytic-hydrocarbon adsorbent 43. A hydrocarbon adsorbent layer 59 consisting of zeolite is layered on the cordierite honeycomb substratum 60 for an under layer. A catalytic-adsorbent layer 61, where hydrocarbon adsorber 62 consisting of zeolite is mixed with a three-way catalyst 63 carrying precious metal, is layered on the hydrocarbon adsorbent layer 59 for an over layer.

Second Embodiment

The second embodiment will be described with reference to the diagram of FIGS. 8, 9 and 10. The basic composition is similar of that as shown in FIG. 1. Therefore, the same structures are given the same reference characters as in FIG. 1, and the explanation is not repeated for the sake of brevity and clarity.

Figure 8:
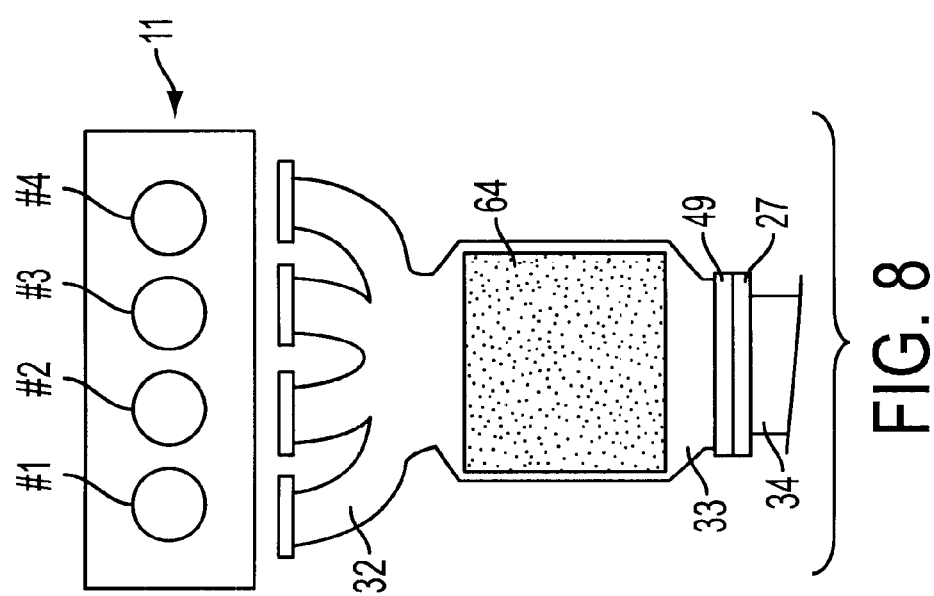
FIG. 8 is a partial schematic view of an exhaust gas purification apparatus in a multi-cylinder internal combustion engine, of another preferred embodiment of this invention.

FIG. 8 shows the exhaust manifold 32, having the pre-converter container 33, connected to the exhaust port 30 of the cylinder head 31. In the pre-converter container 33, a combined catalytic-hydrocarbon adsorbent 64 is arranged solely.

Figure 9:
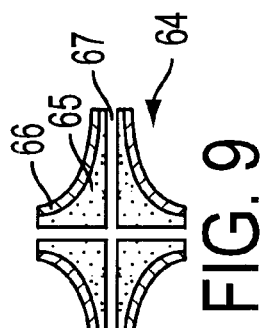
FIG. 9 illustrates a portion of a combined catalytic-hydrocarbon adsorbent, on an enlarged scale, in view of exhaust gas flow.

FIG. 9 illustrates a part of the combined catalytic-hydrocarbon adsorbent 64 on enlarged scale in view of exhaust gas flow. A hydrocarbon adsorbent layer 65 (hydrocarbon adsorber) consists of zeolite for an under layer and a three-way catalytic layer 66 (three-way catalyst) carrying precious metal for an over layer are layered on a cordierite honeycomb substratum 67.

With such combined catalytic-hydrocarbon adsorbent 64, the three-way catalytic layer 66 exists on the upstream side of the combined catalytic-hydrocarbon adsorbent 64. Thus, hydrocarbons desorbed from the downstream side of the hydrocarbon adsorbent layer 65 flow backward by the action of the strong pulsing stream of the exhaust gas, and come contact with the three-way catalytic layer 66 exists on the upstream side of the combined catalytic-hydrocarbon adsorbent 64. Now, the three-way catalytic layer 66 exists on the upstream side of the combined catalytic-hydrocarbon adsorbent 64 can reach its activation temperature before the hydrocarbon adsorbent layer 65 exists on the downstream side of the combined catalytic-hydrocarbon adsorbent 64 starts to desorb hydrocarbons. Thus, hydrocarbons desorbed from the downstream side of the hydrocarbon adsorbent layer 65 are oxidized with the three-way catalytic layer 66 exists on the upstream side of the combined catalytic-hydrocarbon adsorbent 64.

Figure 10:
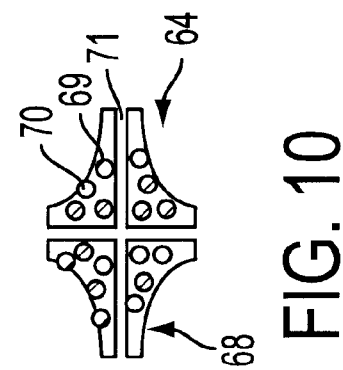
FIG. 10 illustrates a portion of a combined catalytic-hydrocarbon adsorbent showing another modification, on an enlarged scale, in view of exhaust gas flow.

FIG. 10 illustrates another modification of the combined catalytic-hydrocarbon adsorbent 64. A catalytic-adsorbent layer 68, where a hydrocarbon adsorber 69 consisting of zeolite is mixed with a three-way catalyst 70 carrying precious metal, is layered on a cordierite honeycomb substratum 71.

Third Embodiment

The third embodiment will be described with reference to the diagram of FIGS. 11–15. The basic composition is similar of that as shown in FIG. 1. Therefore, the same structures are given the same reference characters as in FIG. 1, and the explanation is not repeated for the sake of brevity and clarity.

Figure 11:
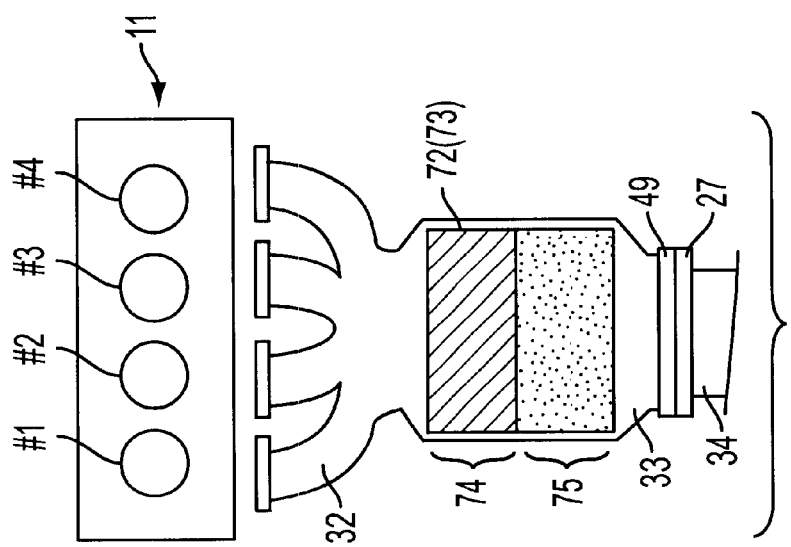
FIG. 11 is a partial schematic view of an exhaust gas purification apparatus in a multi-cylinder internal combustion engine, of another preferred embodiment of this invention.

FIG. 11 shows the exhaust manifold 32, having the pre-converter container 33, connected to the exhaust port 30 of the cylinder head 31. In the pre-converter container 33, a sole honeycomb substratum 73 forming a combined catalytic-hydrocarbon adsorbent 72 is arranged. A three-way catalytic converter 74 is formed on the upstream side of the honeycomb substratum 73. A combined catalytic-hydrocarbon adsorbent 75 is formed on the downstream of the honeycomb substratum 73. As another variation, an oxidation catalytic converter can be applied instead of the three-way catalytic converter.

Figure 12:
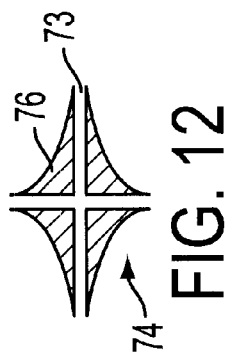
FIG. 12 illustrates a portion of a three-way catalytic converter, on an enlarged scale, in view of exhaust gas flow.

FIG. 12 illustrates the upstream side of the combined catalytic-hydrocarbon adsorbent 72 on enlarged scale in view of exhaust gas flow. A three-way catalytic layer 76 (three-way catalyst) carrying precious metal is layered on the upstream side of the honeycomb substratum 73. The three-way catalytic layer 76 preferably includes palladium for light off catalytic conversion.

Figure 13:
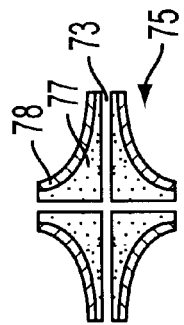
FIG. 13 illustrates a portion of a combined catalytic-hydrocarbon adsorbent, on an enlarged scale, in view of exhaust gas flow.

FIG. 13 illustrates the downstream side of the combined catalytic-hydrocarbon adsorbent 72 on enlarged scale in view of exhaust gas flow. A hydrocarbon adsorbent layer 77 (hydrocarbon adsorber) consists of zeolite for an under layer and a three-way catalytic layer 78 (three-way catalyst) carrying precious metal for an over layer are layered on the downstream side of the honeycomb substratum 73.

With such combined catalytic-hydrocarbon adsorbent 72, the three-way catalytic layer 76 exists on the upstream side of the combined catalytic-hydrocarbon adsorbent 72. Thus, hydrocarbons desorbed from the hydrocarbon adsorbent layer 77 flow backward by the action of the strong pulsing stream of the exhaust gas, and come contact with the three-way catalytic layer 76 exists on the upstream side of the combined catalytic-hydrocarbon adsorbent 72 again.

In addition, the three-way catalytic layer 76 exists on the upstream side of the combined catalytic-hydrocarbon adsorbent 72 can reach its activation temperature before the hydrocarbon adsorbent layer 77 exists on the downstream side of the combined catalytic-hydrocarbon adsorbent 72 starts to desorb hydrocarbons. Thus, hydrocarbons desorbed from the downstream side of the hydrocarbon adsorbent layer 77 are oxidized with the three-way catalytic layer 76 exists on the upstream side of the combined catalytic-hydrocarbon adsorbent 72.

Figure 14:
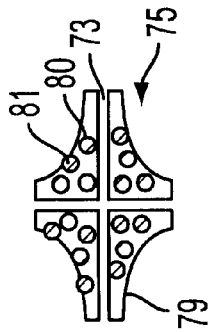
FIG. 14 illustrates a portion of a combined catalytic-hydrocarbon adsorbent showing another modification, on an enlarged scale, in view of exhaust gas flow.

FIG. 14 illustrates another modification of the combined catalytic-hydrocarbon adsorbent 72. A catalytic-adsorbent layer 79, where a hydrocarbon adsorber 80 consisting of zeolite is mixed with a three-way catalyst 81 carrying precious metal, is layered on the downstream side of the honeycomb substratum 73.

Figure 15:
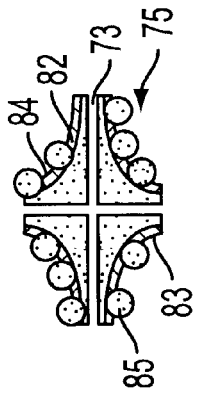
FIG. 15 illustrates a portion of a combined catalytic-hydrocarbon adsorbent showing another modification, on an enlarged scale, in view of exhaust gas flow.

FIG. 15 illustrates further another modification of the combined catalytic-hydrocarbon adsorbent 72. A hydrocarbon adsorbent layer 82 consisting of zeolite is layered on the downstream side of the honeycomb substratum 73 for an under layer. A catalytic-adsorbent layer 83, where hydrocarbon adsorber 84 consisting of zeolite is mixed with a three-way catalyst 85 carrying precious metal, is layered on the hydrocarbon adsorbent layer 82 for an over layer.

Fourth Embodiment

The fourth embodiment will be described with reference to the diagram of FIGS. 16–22. The basic composition is similar of that as shown in FIG. 1. Therefore, the same structures are given the same reference characters as in FIG. 1, and the explanation is not repeated for the sake of brevity and clarity.

Referring to FIG. 16, a pre-converter container 86 is connected to an exhaust manifold 87 through flanges 97, 98 thereof, and a front tube 88 is connected to the pre-converter container 86 through flanges 99, 100 thereof. In the pre-converter container 86, a three-way catalytic converter 89 and a combined catalytic-hydrocarbon adsorbent 90 are arranged adjacent to each other in series from an upstream side so as to give a predetermined small space 91. As another variation, no space between the three-way catalytic converter and the combined catalytic-hydrocarbon adsorbent is applicable.

Thus, the combination of the three-way catalytic converter 89 and the combined catalytic-hydrocarbon adsorbent 90 is arranged immediately downstream of the point where exhaust gas discharged from each cylinder gets together.

FIG. 17 shows a part of the three-way catalytic converter 89 on enlarged scale in view of exhaust gas flow. A three-way catalytic layer 92 (three-way catalyst) carrying precious metal is layered on a honeycomb substratum 93. Preferably the honeycomb substratum 93 is made of a kind of metal for rapidly temperature rising in the start-up period of the engine. As another variation, an oxidation catalytic converter can be applied instead of the three-way catalytic converter.

FIG. 18 shows a part of the combined catalytic-hydrocarbon adsorbent 90 on enlarged scale in view of exhaust gas flow. A hydrocarbon adsorbent layer 94 (hydrocarbon adsorber) consists of zeolite for an under layer and a three-way catalytic layer 95 (three-way catalyst) carrying precious metal for an over layer are layered on a cordierite honeycomb substratum 96.

Figure 21:
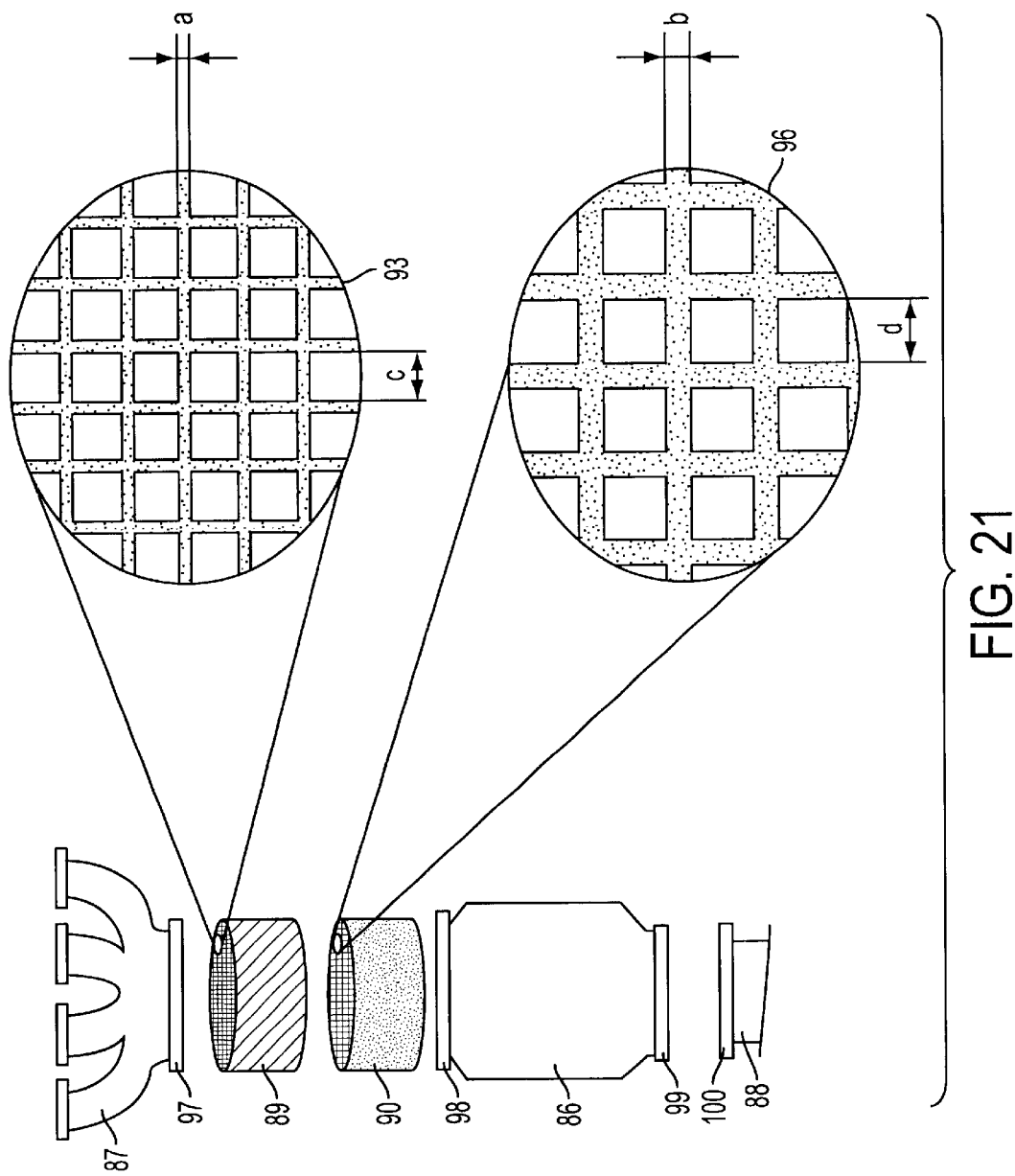
FIG. 21 is a schematic diagram of a three-way catalytic converter and a combined catalytic-hydrocarbon adsorbent installed in a pre-converter container.

Now, referring to FIG. 21, a cell density, i.e., the number of cell per unit area, of the three-way catalytic converter 89 is designed larger than that of the combined catalytic-hydrocarbon adsorbent 90 (c<d). In addition, the honeycomb substratum 86 of the three-way catalytic converter 89 is designed thinner than that of the combined catalytic-hydrocarbon adsorbent (a<b). In this manner, though the cell density of the three-way catalytic converter 89 increases, the increase of the heat-mass of the three-way catalytic converter 89 can be suppressed to the minimum because the honeycomb substratum 86 is designed thin. On the other hand, a reactive heat at the three-way catalytic converter 89 increases because the surface area of the three-way catalytic converter 89 where exhaust gas gets contact with increases. Thus, the three-way catalytic converter 89 can reach its activation temperature quickly.

Moreover, in this manner, since the heat-mass of the combined catalytic-hydrocarbon adsorbent 90 is larger than the three-way catalytic converter 89, the combined catalytic-hydrocarbon adsorbent 90 reaches its desorbing temperature slowly. Thus, when he combined catalytic-hydrocarbon adsorbent 90 starts to desorb hydrocarbons, the three-way catalytic converter 89 has already activated enough. Consequently, hydrocarbons flowing backward in the direction of the three-way catalytic converter 89 are oxidized with the three-way catalytic converter 90 efficiently.

FIG. 19 illustrates another modification of the combined catalytic-hydrocarbon adsorbent 90. A catalytic-adsorbent layer 101, where a hydrocarbon adsorber 102 consisting of zeolite is mixed with a three-way catalyst 103 carrying precious metal, is layered on a cordierite honeycomb substratum 96.

FIG. 20 illustrates further another modification of the combined catalytic-hydrocarbon adsorbent 90. A hydrocarbon adsorbent layer 104 consisting of zeolite is layered on the cordierite honeycomb substratum 96 for an under layer. A catalytic-adsorbent layer 105, where a hydrocarbon adsorber 106 consisting of zeolite is mixed with a three-way catalyst 107 carrying precious metal, is layered on the hydrocarbon adsorbent layer 104 for an over layer.

Figure 22:
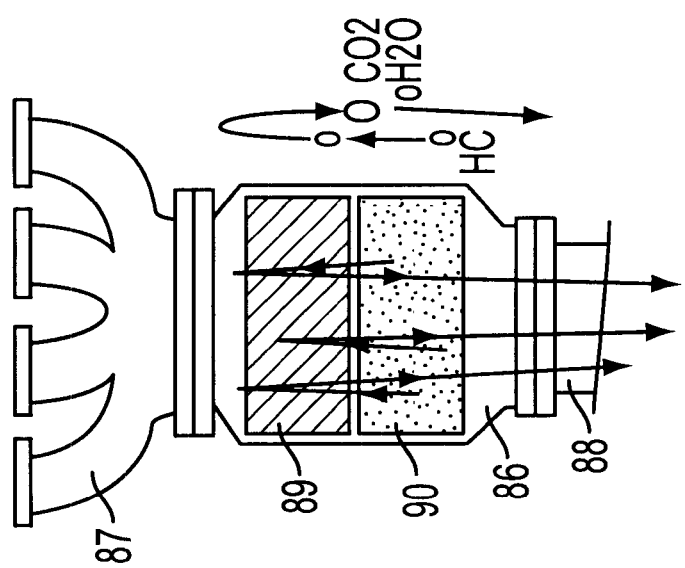
FIG. 22 is a graphical diagram illustrating a process that hydrocarbons desorbed from a combined catalytic-hydrocarbon adsorbent are oxidized.

With this embodiment, the combination of the three-way catalytic converter 89 and the combined catalytic-hydrocarbon adsorbent 90 is installed at immediately downstream where. exhaust gas discharged from each cylinder 12 gets together. Thus, as shown in FIG. 22, hydrocarbons desorbed from the combined catalytic-hydrocarbon adsorbent 90 are affected by an action of a strong pulsing stream of the exhaust gas, and flow backward in the direction of the three-way catalytic converter 89. Therefore, hydrocarbons desorbed from the combined catalytic-hydrocarbon adsorbent 90 go through the three-way catalytic converter 89 again, and are oxidized with the three-way catalytic converter 89. In other word, hydrocarbons desorbed from the combined catalytic-hydrocarbon adsorbent 90 are decomposed into carbon dioxide and water with the three-way catalytic converter 89.

Fifth Embodiment

The fifth embodiment will be described with reference to the diagram of FIGS. 23–26. The basic composition is similar of that as shown in FIG. 1. Therefore, the same structures are given the same reference characters as in FIG. 1, and the explanation is not repeated for the sake of brevity and clarity.

Referring to FIG. 23, a pre-converter container 86 is connected to an exhaust manifold 87 through flanges 97, 98 thereof, and a front tube 88 is connected to the pre-converter container 86 through flanges 99, 100 thereof. In the pre-converter container 86, a combined catalytic-hydrocarbon adsorbent 108 is arranged solely.

FIG. 24 illustrates a part of the combined catalytic-hydrocarbon adsorbent 108 on enlarged scale in view of exhaust gas flow. A hydrocarbon adsorbent layer 109 (hydrocarbon adsorber) consists of zeolite for an under layer and a three-way catalytic layer 110 (three-way catalyst) carrying precious metal for an over layer are layered on a cordierite honeycomb substratum 111. The hydrocarbon adsorbent layer 109 and the three-way catalytic layer 110 are layered on from the upstream side to the downstream side of the cordierite honeycomb substratum 111.

Figure 26:
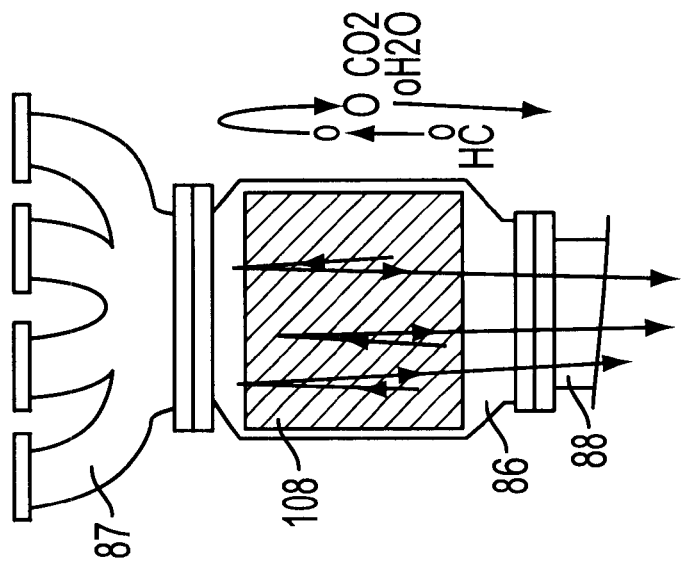
FIG. 26 is a graphical diagram illustrating a process that hydrocarbons desorbed from a combined catalytic-hydrocarbon adsorbent are oxidized.

With such combined catalytic-hydrocarbon adsorbent 108, the three-way catalytic layer 110 exists on the upstream side of the combined catalytic-hydrocarbon adsorbent 108. On the other hand, the combined catalytic-hydrocarbon adsorbent 108 is installed at immediately downstream where exhaust gas discharged from each cylinder gets together. Thus, the three-way catalytic layer 109 exists on the upstream side of the combined catalytic-hydrocarbon adsorbent 108 can reach its activation temperature before the hydrocarbon adsorbent layer 110 exists on the downstream side of the combined catalytic-hydrocarbon adsorbent 108 starts to desorb hydrocarbons. Consequently, as shown in FIG. 26, hydrocarbons desorbed from the downstream side of the combined catalytic-hydrocarbon adsorbent 108 (hydrocarbon adsorbent layer 109) flow backward by the action of the strong pulsing stream of the exhaust gas. Thus, hydrocarbons desorbed from the downstream side of the combined catalytic-hydrocarbon adsorbent 108 go through the three-way catalytic layer 109 exists on the upstream side of the combined catalytic-hydrocarbon adsorbent 108 again. Then hydrocarbons desorbed from the downstream side of the combined catalytic-hydrocarbon adsorbent 108 are decomposed into carbon dioxide and water with the three-way catalytic layer 110 exists on the upstream side of the combined catalytic-hydrocarbon adsorbent 108.

FIG. 25 illustrates another modification of the combined catalytic-hydrocarbon adsorbent 108. A catalytic-adsorbent layer 112, where a hydrocarbon adsorber 113 consisting of zeolite is mixed with a three-way catalyst 114 carrying precious metal, is layered on a cordierite honeycomb substratum 115.

Sixth Embodiment

The sixth embodiment will be described with reference to the diagram of FIGS. 27–31. The basic composition is similar of that as shown in FIG. 1. Therefore, the same structures are given the same reference characters as in FIG. 1, and the explanation is not repeated for the sake of brevity and clarity.

Figure 27:
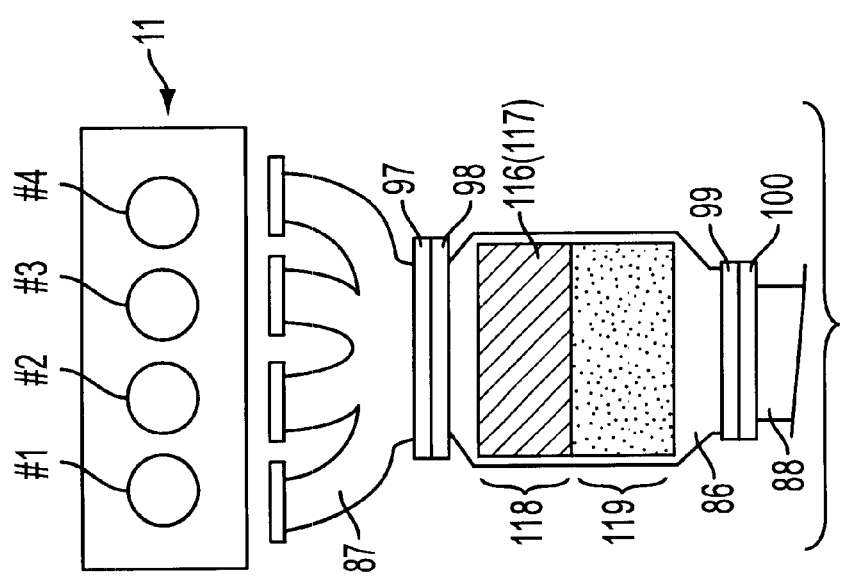
FIG. 27 is a partial schematic view of an exhaust gas purification apparatus in a multi-cylinder internal combustion engine, of another preferred embodiment of this invention.

Referring to FIG. 27, a pre-converter container 86 is connected to an exhaust manifold 87 through flanges 97, 98 thereof, and a front tube 88 is connected to the pre-converter container 86 through flanges 99, 100 thereof. In the pre-converter container 86, a sole honeycomb substratum 117 forming a combined catalytic-hydrocarbon adsorbent 116 is arranged. A three-way catalytic converter 118 is formed on the upstream side of the honeycomb substratum 117. A combined catalytic-hydrocarbon adsorbent 119 is formed on the downstream of the honeycomb substratum 117.

Figure 28:
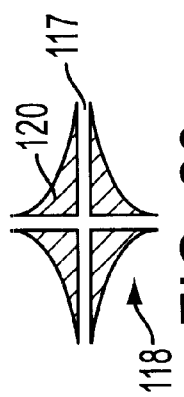
FIG. 28 illustrates a portion of a three-way catalytic converter, on an enlarged scale, in view of exhaust gas flow.

FIG. 28 illustrates the upstream side of the combined catalytic-hydrocarbon adsorbent 116 on enlarged scale in view of exhaust gas flow. A three-way catalytic layer 120 (three-way catalyst) carrying precious metal is layered on the upstream side of the honeycomb substratum 117. The three-way catalytic layer 120 preferably includes palladium for light off catalytic conversion. As another variation, an oxidation catalytic converter can be applied instead of the three-way catalytic converter.

Figure 29:
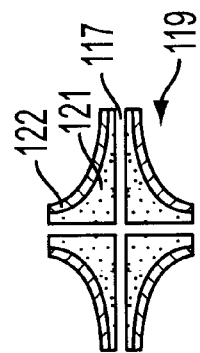
FIG. 29 illustrates a portion of a combined catalytic-hydrocarbon adsorbent, on an enlarged scale, in view of exhaust gas flow.

FIG. 29 illustrates the downstream side of the combined catalytic-hydrocarbon adsorbent 116 on enlarged scale in view of exhaust gas flow. A hydrocarbon adsorbent layer 121 (hydrocarbon adsorber) consists of zeolite for an under layer and a three-way catalytic layer 122 (three-way catalyst) carrying precious metal for an over layer are layered on the downstream side of the honeycomb substratum 117.

With such combined catalytic-hydrocarbon adsorbent 116, the combined catalytic-hydrocarbon adsorbent 116 is installed at immediately downstream where exhaust gas discharged from each cylinder gets together. On the other hand, the three-way catalytic layer 120 exists on the upstream side of the combined catalytic-hydrocarbon adsorbent 116. Thus, hydrocarbons desorbed from the downstream side of the hydrocarbon adsorbent layer 121 flow backward by the action of the strong pulsing stream of the exhaust gas, then go through the three-way catalytic layer 120 exists on the upstream side of the combined catalytic-hydrocarbon adsorbent 116.

Now, the three-way catalytic layer 120 exists on the upstream side of the combined catalytic-hydrocarbon adsorbent 116, can reach its activation temperature before the hydrocarbon adsorbent layer 121 exists on the downstream side of the combined catalytic-hydrocarbon adsorbent 116 starts to desorb hydrocarbons. Thus, hydrocarbons desorbed from the downstream side of the hydrocarbon adsorbent layer 121 are oxidized with the three-way catalytic layer 116 exists on the upstream side of the combined catalytic-hydrocarbon adsorbent 120.

Figure 30:
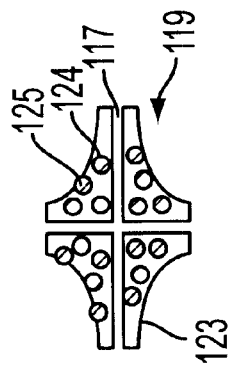
FIG. 30 illustrates a portion of a combined catalytic-hydrocarbon adsorbent showing another modification, on an enlarged scale, in view of exhaust gas flow.

FIG. 30 illustrates another modification of the combined catalytic-hydrocarbon adsorbent 116. A catalytic-adsorbent layer 123, where a hydrocarbon adsorber 124 consisting of zeolite is mixed with a three-way catalyst 125 carrying precious metal, is layered on the downstream side of the honeycomb substratum 117.

Figure 31:
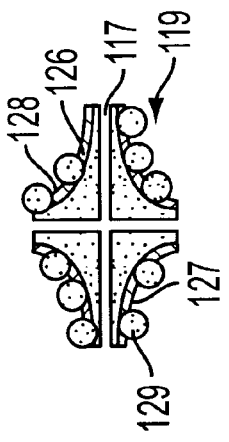
FIG. 31 illustrates a portion of a combined catalytic-hydrocarbon adsorbent showing further another modification, on an enlarged scale, in view of exhaust gas flow.

FIG. 31 illustrates further another modification of the combined catalytic-hydrocarbon adsorbent 116. A hydrocarbon adsorbent layer 126 consisting of zeolite is layered on the downstream side of the honeycomb substratum 117 for an under layer. A catalytic-adsorbent layer 127, where hydrocarbon adsorber 128 consisting of zeolite is mixed with a three-way catalyst 129 carrying precious metal, is layered on the hydrocarbon adsorbent layer 126 for an over layer.

Seventh Embodiment

The seventh embodiment will be described with reference to the diagram of FIGS. 32–37, and 38A–C.

The basic composition is similar of that as shown in FIG. 1. Therefore, the same structures are given the same reference characters as in FIG. 1, and the explanation is not repeated for the sake of brevity and clarity.

Figure 33:
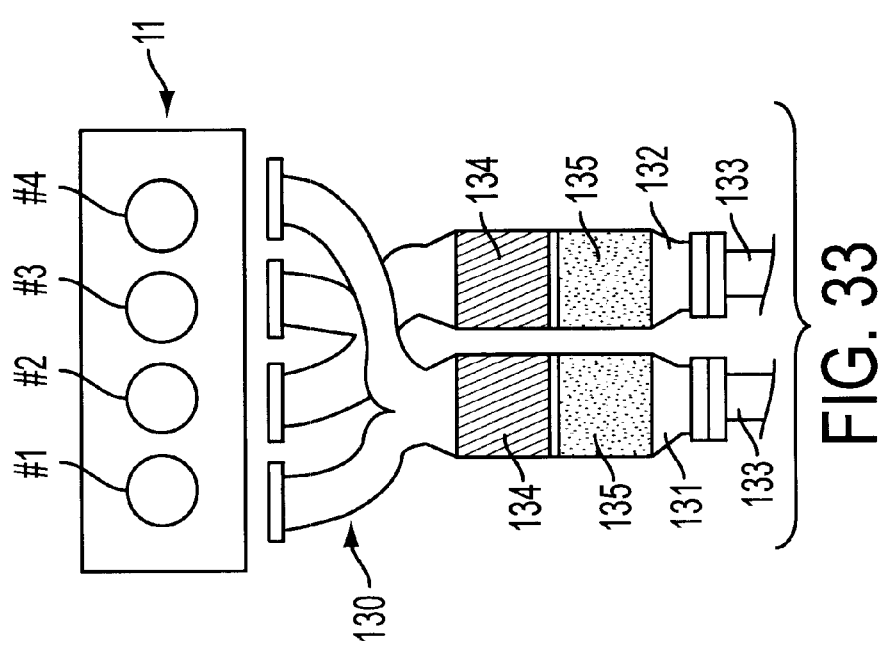
FIG. 33 is a partial schematic view of an exhaust gas purification apparatus in a multi-cylinder internal combustion engine, of another preferred embodiment of this invention.

FIGS. 32 and 33 shows an exhaust manifold 130, for a four-cylinder engine 11, connected to the cylinder head 31. The exhaust manifold 130 has a first pre-converter container 131 and a second pre-converter container 132. The first pre-converter container 131 is arranged at the confluence of exhaust gas from the #1 cylinder and the #4 cylinder. Also, the second pre-converter container 132 is arranged at the confluence of exhaust gas from the #2 cylinder and the #3 cylinder. A front tube 133 is connected to pre-containers 131 and 132 respectively. The front tube 133 merges into one passage at its downstream side, and connects to the center tube 35.

Three-way catalytic converters 134 and combined catalytic-hydrocarbon adsorbents 135 are disposed in the first and second pre-converter container 131,132 respectively. The three-way catalytic converter 134 and the combined catalytic-hydrocarbon adsorbent 135 are arranged adjacent to each other in series from an upstream side so as to give a predetermined small space 136. As another variation, no space between the three-way catalytic converter 134 and the combined catalytic-hydrocarbon adsorbent 135. As further another variation, oxidation catalytic converters can be applied instead of the three-way catalytic converters.

Figure 34:
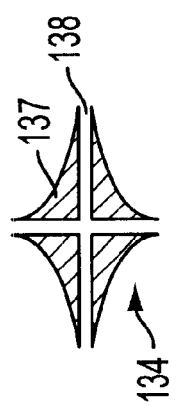
FIG. 34 illustrates a portion of a three-way catalytic converter, on an enlarged scale, in view of exhaust gas flow.

The three-way catalytic converter 134 preferably includes palladium for light off catalytic conversion. FIG. 34 shows a part of the three-way catalytic converter 134 on enlarged scale in view of exhaust gas flow. A three-way catalytic layer 137 (three-way catalyst) carrying precious metal is layered on a honeycomb substratum 138. Preferably the honeycomb substratum 138 is made of a kind of metal for rapidly temperature rising in the start-up period of the engine.

Figure 35:
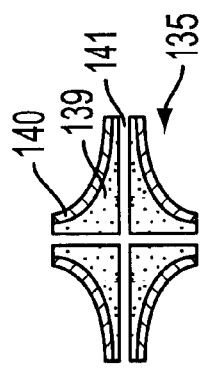
FIG. 35 illustrates a portion of a combined catalytic-hydrocarbon adsorbent, on an enlarged scale, in view of exhaust gas flow.

FIG. 35 shows a part of the combined catalytic-hydrocarbon adsorbent 135 on enlarged scale in view of exhaust gas flow. A hydrocarbon adsorbent layer 139 (hydrocarbon adsorber) consists of zeolite for an under layer and a three-way catalytic layer 140 (three-way catalyst) carrying precious metal for an over layer are layered on a cordierite honeycomb substratum 141.

Figure 38A:
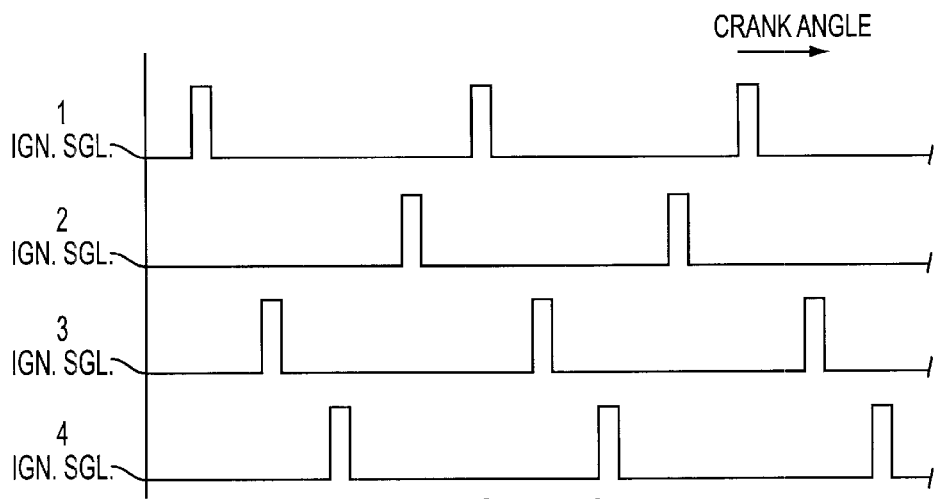
FIG. 38A is a graphical diagram illustrating an ignition signal with respect to crank angle of an engine.
Figure 38B:
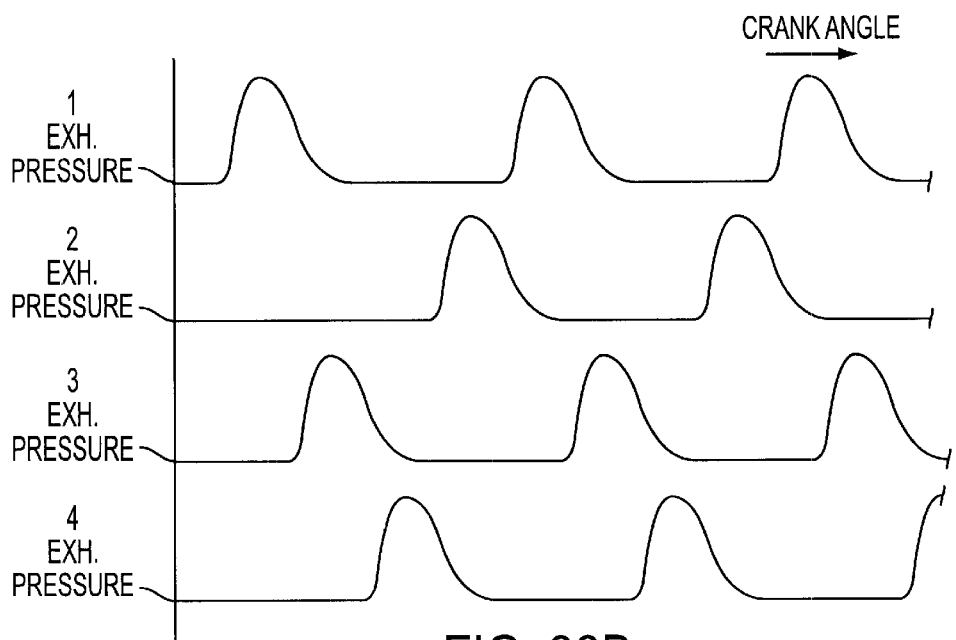
FIG. 38B is a graphical diagram illustrating an exhaust gas pressure of each cylinder with respect to crank angle of an engine.
Figure 38C:
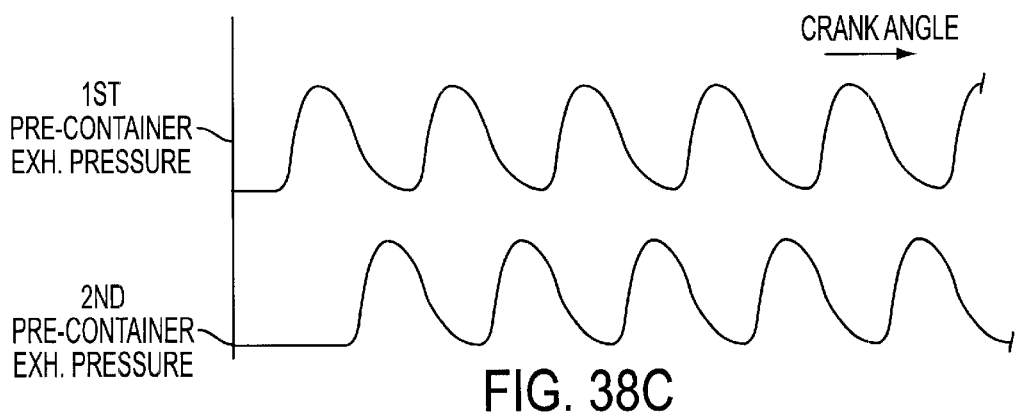
FIG. 38C is a graphical diagram illustrating an exhaust gas pressure in a first and second pre-converter containers with respect to crank angle of an engine.

In a four-cylinder engine, as shown in FIG. 38A, ignition in the cylinder occurs in the order of #1, #3, #4 and #2, and an exhaust pressure of each cylinder appears in time sequence as shown in FIG. 38B. Thus, as shown in FIG. 38C, an exhaust gas interference does not occur at the confluence of exhaust gas from the #1 cylinder and the #4 cylinder. Similarly, as shown in FIG. 38C, exhaust gas interference does not occur at the confluence of exhaust gas from the #2 cylinder and the #3 cylinder.

Now, the first pre-converter container 131 positions at immediately downstream of a position where exhaust gas from the #1 cylinder and the #4 cylinder merges, and the second pre-converter container 132 positions at immediately downstream of a position where exhaust gas from the #2 cylinder and the #3 cylinder merges. Thus, a pulsing stream of the exhaust gas is kept strong at the point where combined catalytic-hydrocarbon adsorbents 135 are arranged, and hydrocarbons desorbed from the hydrocarbon adsorbent layer 139 are strongly affected by an action of a pulsing stream of the exhaust gas.

Referring to FIG. 7, a line (B) shows an exhaust gas pressure at the combined catalytic-hydrocarbon adsorbent 135. The exhaust gas pressure at the combined catalytic-hydrocarbon adsorbent 135 changes inversely from plus side to minus side for the average of the exhaust gas pressure. When the exhaust gas pressure shifts minus side, hydrocarbons desorbed from the hydrocarbon adsorbent layer 139 flow backward in the direction of the three-way catalytic converter. Especially, comparing with the line (a), since a negative pressure develops larger than the line (a) as shown PS, hydrocarbons flow backward in the direction of the three-way catalytic converter 134 efficiently.

Figure 36:
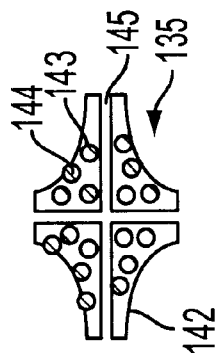
FIG. 36 illustrates a portion of a combined catalytic-hydrocarbon adsorbent showing another modification, on an enlarged scale, in view of exhaust gas flow.

FIG. 36 illustrates another modification of the combined catalytic-hydrocarbon adsorbent 135. A catalytic-adsorbent layer 142, where a hydrocarbon adsorber 143 consisting of zeolite is mixed with a three-way catalyst 144 carrying precious metal, is layered on a cordierite honeycomb substratum 145.

Figure 37:
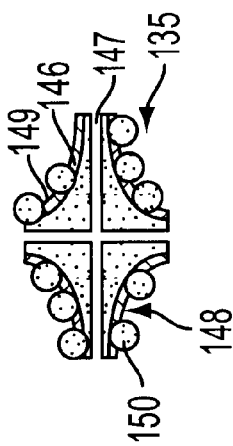
FIG. 37 illustrates a portion of a combined catalytic-hydrocarbon adsorbent showing further another modification, on an enlarged scale, in view of exhaust gas flow.

FIG. 37 illustrates further another modification of the combined catalytic-hydrocarbon adsorbent 135. A hydrocarbon adsorbent layer 146 consisting of zeolite is layered on the cordierite honeycomb substratum 147 for an under layer. A catalytic-adsorbent layer 148, where hydrocarbon adsorber 149 consisting of zeolite is mixed with a three-way catalyst 150 carrying precious metal, is layered on the hydrocarbon adsorbent layer for an over layer.

Eighth Embodiment

The eighth embodiment will be described with reference to the diagram of FIGS. 39–41. The basic composition is similar of that as shown in FIGS. 1, 32. Therefore, the same structures are given the same reference characters as in FIGS. 1, 32, and the explanation is not repeated for the sake of brevity and clarity.

Figure 39:
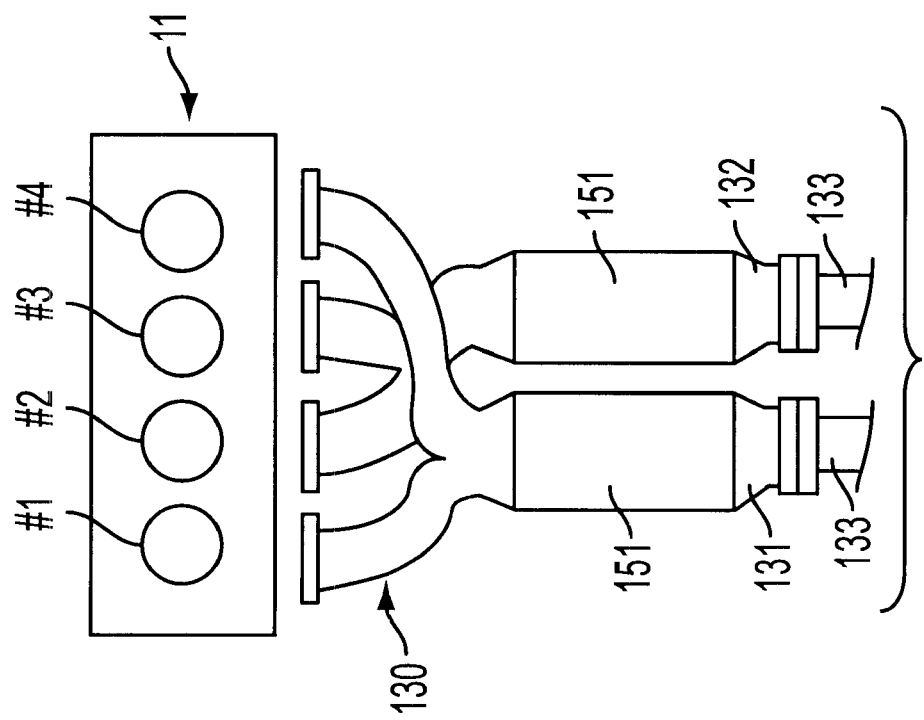
FIG. 39 is a partial schematic view of an exhaust gas purification apparatus in a multi-cylinder internal combustion engine, of another preferred embodiment of this invention.

FIG. 39 shows an exhaust manifold 130, having a first pre-converter container 131 and a second pre-converter container 132, connected to the exhaust port 30 in the cylinder head 31. The first pre-converter container 131 is arranged at the confluence of exhaust gas from the #1 cylinder and the #4 cylinder. Also, the second pre-converter container 132 is arranged at the confluence of exhaust gas from the #2 cylinder and the #3 cylinder. In pre-converter containers 131, 132, combined catalytic-hydrocarbon adsorbents 151 are arranged respectively.

Figure 40:
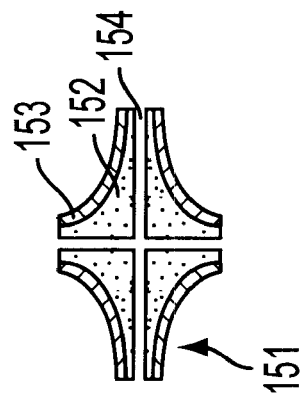
FIG. 40 illustrates a portion of a combined catalytic-hydrocarbon adsorbent, on an enlarged scale, in view of exhaust gas flow.

FIG. 40 illustrates a part of the combined catalytic-hydrocarbon adsorbent 151 on enlarged scale in view of exhaust gas flow. A hydrocarbon adsorbent layer 152 (hydrocarbon adsorber) consists of zeolite for an under layer and a three-way catalytic layer 153 (three-way catalyst) carrying precious metal for an over layer are layered on a cordierite honeycomb substratum 154. The hydrocarbon adsorbent layer 152 and the three-way catalytic layer 153 are layered on from the upstream side to the downstream side of the cordierite honeycomb substratum 154.

With such combined catalytic-hydrocarbon adsorbent 151, the three-way catalytic layer 153 exists on the upstream side of the combined catalytic-hydrocarbon adsorbent 151. Thus, hydrocarbons desorbed from the downstream side of the hydrocarbon adsorbent layer 152 flow backward by the action of the strong pulsing stream of the exhaust gas, then go through the three-way catalytic layer 153 exists on the upstream side of the combined catalytic-hydrocarbon adsorbent 151 again. Especially, the first pre-converter container 131 positions at immediately downstream of a position where exhaust gas from the #1 cylinder and the #4 cylinder meets, and the second pre-converter container 132 positions at immediately downstream of a position where exhaust gas from the #2 cylinder and the #3 cylinder meets. Thus, the pulsing stream of the exhaust gas is kept strong at the place where combined catalytic-hydrocarbon adsorbents 151 are arranged.

On the other hand, the three-way catalytic layer 153 exists on the upstream side of the combined catalytic-hydrocarbon adsorbent 151 can reach its activation temperature before the hydrocarbon adsorbent layer 152 exists on the downstream side of the combined catalytic-hydrocarbon adsorbent 151 starts to desorb hydrocarbons. Thus, hydrocarbons desorbed from the downstream side of the hydrocarbon adsorbent layer 152 are oxidized with the three-way catalytic layer 153 exists on the upstream side of the combined catalytic-hydrocarbon adsorbent 151.

Figure 41:
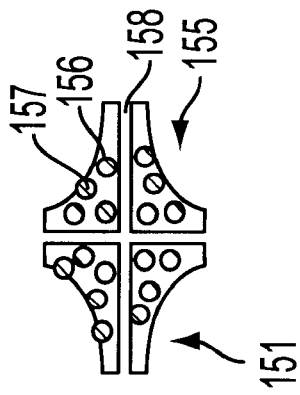
FIG. 41 illustrates a portion of a combined catalytic-hydrocarbon adsorbent showing another modification, on an enlarged scale, in view of exhaust gas flow.

FIG. 41 illustrates another modification of the combined catalytic-hydrocarbon adsorbent 151. A catalytic-adsorbent layer 155, where a hydrocarbon adsorber 156 consisting of zeolite is mixed with a three-way catalyst 157 carrying precious metal, is layered on a cordierite honeycomb substratum 158.

Ninth Embodiment

The ninth embodiment will be described with reference to the diagram of FIGS. 42–46. The basic composition is similar of that as shown in FIGS. 1, 32. Therefore, the same structures are given the same reference characters as in FIGS. 1, 32, and the explanation is not repeated for the sake of brevity and clarity.

FIG. 42 shows an exhaust manifold 130, having a first pre-converter container 131 and a second pre-converter container 132, connected to the exhaust port 30 in the cylinder head 31. The first pre-converter container 131 is arranged at the confluence of exhaust gas from the #1 cylinder and the #4 cylinder. Also, the second pre-converter container 132 is arranged at the confluence of exhaust gas from the #2 cylinder and the #3 cylinder. In the pre-converter containers 131, 132, a sole honeycomb substratum 160 forming a combined catalytic-hydrocarbon adsorbent 159 is arranged respectively. A three-way catalytic converter 161 is formed on the upstream side of the honeycomb substratum 160. A combined catalytic-hydrocarbon adsorbent 162 is formed on the downstream of the honeycomb substratum 160.

FIG. 43 illustrates the upstream side of the combined catalytic-hydrocarbon adsorbent 159 on enlarged scale in view of exhaust gas flow. A three-way catalytic layer 163 (three-way catalyst) carrying precious metal is layered on the upstream side of the honeycomb substratum 160. The three-way catalytic layer 163 preferably includes palladium for light off catalytic conversion. As another variation, an oxidation catalytic converter can be applied instead of the three-way catalytic converter.

FIG. 44 illustrates the downstream side of the combined catalytic-hydrocarbon adsorbent 159 on enlarged scale in view of exhaust gas flow. A hydrocarbon adsorbent layer 164 (hydrocarbon adsorber) consists of zeolite for an under layer and a three-way catalytic layer 165 (three-way catalyst) carrying precious metal for an over layer are layered on the downstream side of the honeycomb substratum 160.

With such combined catalytic-hydrocarbon adsorbent 159, the three-way catalytic layer 163 exists on the upstream side of the combined catalytic-hydrocarbon adsorbent 159. Thus, hydrocarbons desorbed from the downstream side of the hydrocarbon adsorbent layer 164 flow backward by the action of the strong pulsing stream of the exhaust gas, then go through the three-way catalytic layer 163 exists on the upstream side of the combined catalytic-hydrocarbon adsorbent 159 again. Especially, the first pre-converter container 131 positions at immediately downstream of a position where exhaust gas from the #1 cylinder and the #4 cylinder merges, and the second pre-converter container 132 positions at immediately downstream of a position where exhaust gas from the #2 cylinder and the #3 cylinder merges. Thus, the pulsing stream of the exhaust gas is kept strong at the place where the combined catalytic-hydrocarbon adsorbents 159 are arranged.

In addition, the three-way catalytic layer 163 exists on the upstream side of the combined catalytic-hydrocarbon adsorbent 159 can reach its activation temperature before the hydrocarbon adsorbent layer 164 exists on the downstream side of the combined catalytic-hydrocarbon adsorbent starts to desorb hydrocarbons. Thus, hydrocarbons desorbed from the downstream side of the hydrocarbon adsorbent layer 164 are oxidized efficiently with the three-way catalytic layer 163 exists on the upstream side of the combined catalytic-hydrocarbon adsorbent 159.

FIG. 45 illustrates another modification of the combined catalytic-hydrocarbon adsorbent 159. A catalytic-adsorbent layer 166, where a hydrocarbon adsorber 167 consisting of zeolite is mixed with a three-way catalyst 169 carrying precious metal, is layered on the downstream side of the honeycomb substratum 160.

FIG. 46 illustrates further another modification of the combined catalytic-hydrocarbon adsorbent 159. A hydrocarbon adsorbent layer 170 consisting of zeolite is layered on the downstream side of the honeycomb substratum 160 for an inside layer. A catalytic-adsorbent layer 171, where the hydrocarbon adsorber 172 consisting of zeolite is mixed with a three-way catalyst 173 carrying precious metal, is layered on the hydrocarbon adsorbent layer for an over layer.

Tenth Embodiment

The tenth embodiment will be described with reference to the diagram of FIGS. 47–52. The basic composition is similar of that as shown in FIGS. 1, 32. Therefore, the same structures are given the same reference characters as in FIGS. 1, 32, and the explanation is not repeated for the sake of brevity and clarity.

Referring to FIG. 47, a first pre-converter container 131 is connected to the downstream of an exhaust manifold 130 where exhaust gas from the #1 cylinder and the #4 cylinder gets together. Also, a second pre-converter container 132 is connected to the downstream of the an exhaust manifold 130 where exhaust gas from the #2 cylinder and the #3 cylinder gets together. A front tube 133 is connected to pre-converter containers 131, 132 respectively. The front tube 133 merges into one passage at its downstream side, and connects to the center tube 35.

In pre-containers 131, 132, a three-way catalytic converter 174 and a combined catalytic-hydrocarbon adsorbent 175 are arranged adjacent to each other in series from an upstream side so as to give a predetermined small space 176 respectively. As another variation, it can be arranged with no space between the three-way catalytic converter and the combined catalytic-hydrocarbon adsorbent.

FIG. 48 shows a part of the three-way catalytic converter 174 on enlarged scale in view of exhaust gas flow. A three-way catalytic layer 177 (three-way catalyst) carrying precious metal is layered on a honeycomb substratum 178. Preferably the honeycomb substratum 178 is made of a kind of metal for rapidly temperature rising in the start-up period of the engine.

FIG. 49 shows a part of the combined catalytic-hydrocarbon adsorbent 175 on enlarged scale in view of exhaust gas flow. A hydrocarbon adsorbent layer 179 (hydrocarbon adsorber) consists of zeolite for an under layer and a three-way catalytic layer 180 (three-way catalyst) carrying precious metal for an over layer are layered on a cordierite honeycomb substratum 181.

With this embodiment, since the combination of the three-way catalytic converter 174 and the combined catalytic-hydrocarbon adsorbent 175 is installed at immediately downstream of the exhaust manifold 130, hydrocarbons desorbed from the hydrocarbon adsorbent layer 179 are affected by an action of a strong pulsing stream of the exhaust gas. Thus, hydrocarbons desorbed from the hydrocarbon adsorbent layer 179 flow backward by the action of the strong pulsing stream of the exhaust gas, and then go through the three-way catalytic converter 174 again. Especially, the first pre-converter container 131 positions at immediately downstream of a position where exhaust gas from the #1 cylinder and the #4 cylinder gets together, and the second pre-converter container 132 positions at immediately downstream of a position where exhaust gas from the #2 cylinder and the #3 cylinder gets together. Thus, the pulsing stream of the exhaust gas is kept strong at the point where the combined catalytic-hydrocarbon adsorbents 175 are arranged, and hydrocarbons desorbed from the combined catalytic-hydrocarbon adsorbent 175 are oxidized with the three-way catalytic layer 177 exists on the upstream side of the combined catalytic-hydrocarbon adsorbent 175 efficiently.

FIG. 50 illustrates another modification of the combined catalytic-hydrocarbon adsorbent 175 A catalytic-adsorbent layer 182, where a hydrocarbon adsorbent 183 consisting of zeolite is mixed with a three-way catalyst 184 carrying precious metal, is layered on a cordierite honeycomb substratum 185.

FIG. 51 illustrates further another modification of the combined catalytic-hydrocarbon adsorbent 175. A hydrocarbon adsorbent layer 186 consisting of zeolite is layered on the cordierite honeycomb substratum 187 for an under layer. A catalytic-adsorbent layer 188, where a hydrocarbon adsorber 189 consisting of zeolite is mixed with a three-way catalyst 190 carrying precious metal, is layered on the hydrocarbon adsorbent layer 186 for an over layer.

Figure 52:
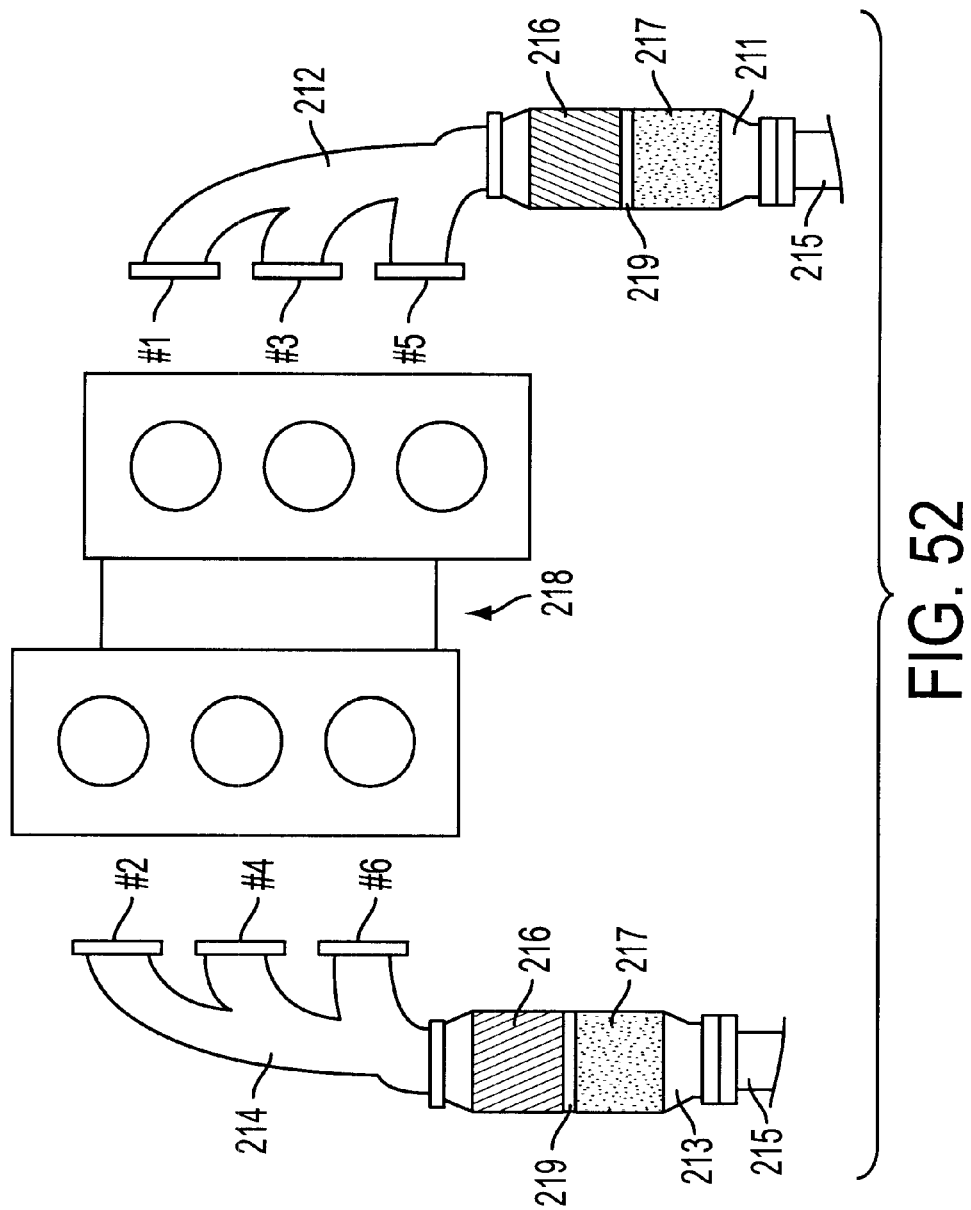
FIG. 52 is a partial schematic view of an exhaust gas purification apparatus in a multi-cylinder internal combustion engine, of another preferred embodiment of this invention.

As a variation of this embodiment, in case of a V-type six-cylinder engine 218, referring to FIG. 52, a first pre-converter container 211 is connected to the downstream of a first exhaust manifold 212 where exhaust gas from the #1 cylinder, the #3 cylinder and the #5 cylinder gets together. Also, a second pre-converter container 213 is connected to the downstream of a second exhaust manifold 214 where exhaust gas from the #2 cylinder, #4 cylinder and the #6 cylinder gets together. A front tube 215 is connected to pre-converter containers 212,213 respectively. The front tube 215 merges into one passage at its downstream side, and connects to the center tube 35.

In the first and second pre-converter containers 212, 213, a three-way catalytic converter 216 and a combined catalytic-hydrocarbon adsorbent 217 are disposed respectively. The three-way catalytic converter 216 and the combined catalytic-hydrocarbon adsorbent 217 are arranged adjacent to each other in series from an upstream side so as to give a predetermined small space 219. As another variation, no space between the three-way catalytic converter and the combined catalytic-hydrocarbon adsorbent is applicable. As further another variation, an oxidation catalytic converter can be applied instead of the three-way catalytic converter.

In the V-type six-cylinder engine like this, ignition occurs in the order of #1, #2, #3, #4, #5 and #6. Now, the first pre-converter container 212 is arranged at a position where exhaust gas from #2, #4 and #6 cylinder gets together, and the second pre-converter container 213 is arranged at a position where exhaust gas from #1, #3 and #5 cylinder gets together. Thus, a pulsing stream of the exhaust gas is kept strong at the place where the combined catalytic-hydrocarbon adsorbents 217 are arranged, and hydrocarbons desorbed from the combined hydrocarbon adsorbent 217 are strongly affected by an action of a pulsing stream of the exhaust gas. Therefore, hydrocarbons desorbed from the combined catalytic-hydrocarbon adsorbent 217 are oxidized with the three-way catalytic converter 216 efficiently.

Eleventh Embodiment

The eleventh embodiment will be described with reference to the diagram of FIGS. 53–55. The basic composition is similar of that as shown in FIGS. 1, 32. Therefore, the same structures are given the same reference characters as in FIGS. 1, 32, and the explanation is not repeated for the sake of brevity and clarity.

Figure 53:
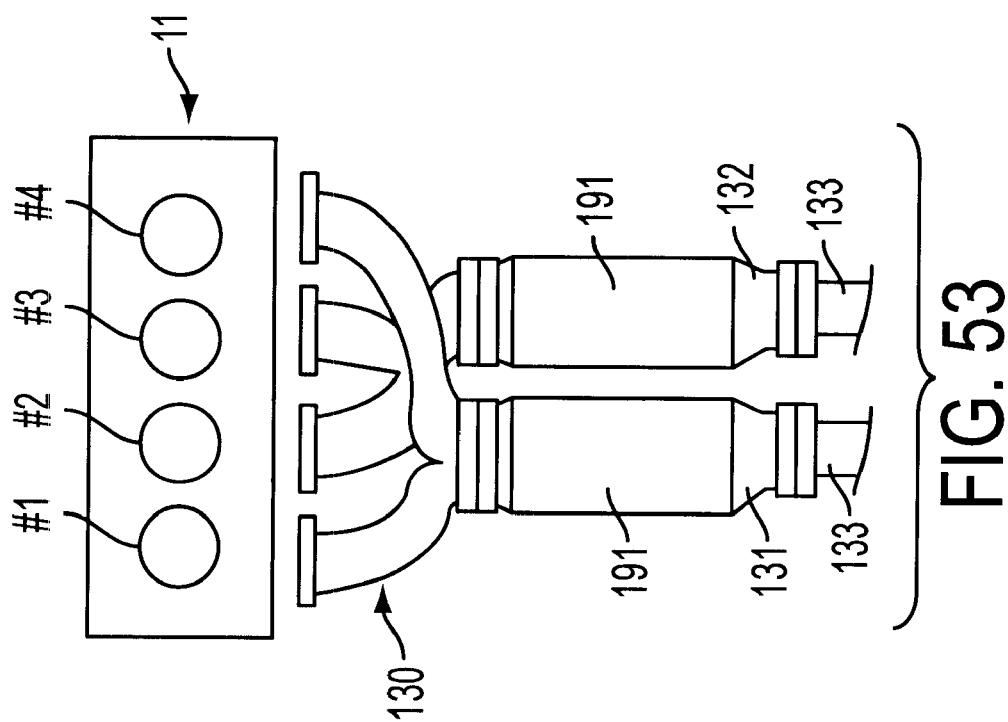
FIG. 53 is a partial schematic view of an exhaust gas purification apparatus in a multi-cylinder internal combustion engine, of another preferred embodiment of this invention.

Referring to FIG. 53, a first pre-converter container 131 is connected to the downstream of an exhaust manifold 130 where exhaust gas from the #1 cylinder and the #4 cylinder gets together. Also, a second pre-converter container 132 is connected to the downstream of the an exhaust manifold 130 where exhaust gas from the #2 cylinder and the #3 cylinder gets together. A front tube 133 is connected to pre-converter containers 131, 132 respectively. The front tube 133 merges into one passage at its downstream side, and connects to the center tube 35. In pre-converter containers 131, 132, a combined catalytic-hydrocarbon adsorbent 191 is arranged respectively.

Figure 54:
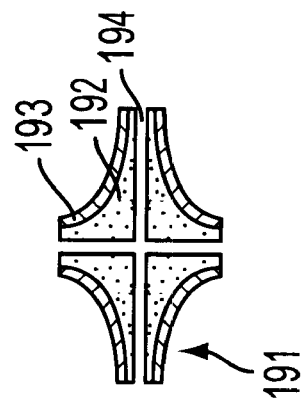
FIG. 54 illustrates a portion of a combined catalytic-hydrocarbon adsorbent, on an enlarged scale, in view of exhaust gas flow.

FIG. 54 illustrates a part of the combined catalytic-hydrocarbon adsorbent 191 on enlarged scale in view of exhaust gas flow. A hydrocarbon adsorbent layer 192 (hydrocarbon adsorber) consists of zeolite for an under layer and a three-way catalytic layer 193 (three-way catalyst) carrying precious metal for an over layer are layered on a cordierite honeycomb substratum 194. The hydrocarbon adsorbent layer 192 and the three-way catalytic layer 193 are layered on from the upstream side to the downstream side of the cordierite honeycomb substratum 194.

With such combined catalytic-hydrocarbon adsorbent 191, the three-way catalytic layer 193 exists on the upstream side of the combined catalytic-hydrocarbon adsorbent 191. Thus, hydrocarbons desorbed from the downstream side of the hydrocarbon adsorbent layer 192 flow backward by the action of the strong pulsing stream of the exhaust gas, then go through the three-way catalytic layer 193 exists on the upstream side of the combined catalytic-hydrocarbon adsorbent 191. Especially, the first pre-converter container 131 positions at immediately downstream of a position where exhaust gas from the #1 cylinder and the #4 cylinder gets together, and the second pre-converter container 132 positions at immediately downstream of a position where exhaust gas from the #2 cylinder and the #3 cylinder gets together. Thus, the pulsing stream of the exhaust gas is kept strong at the place where the combined catalytic-hydrocarbon adsorbents 191 are arranged.

On the other hand, the three-way catalytic layer 193 exists on the upstream side of the combined catalytic-hydrocarbon adsorbent 191 can reach its activation temperature before the hydrocarbon adsorbent layer 192 exists on the downstream side of the combined catalytic-hydrocarbon adsorbent 191 starts to desorb hydrocarbons. Thus, hydrocarbons desorbed from the downstream side of the hydrocarbon adsorbent layer 192 are oxidized with the three-way catalytic layer 193 exists on the upstream side of the combined catalytic-hydrocarbon adsorbent efficiently.

Figure 55:
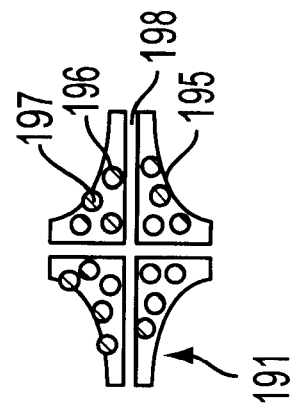
FIG. 55 illustrates a portion of a combined catalytic-hydrocarbon adsorbent showing another modification, on an enlarged scale, in view of exhaust gas flow.

FIG. 55 illustrates another modification of the combined catalytic-hydrocarbon adsorbent 191. A catalytic-adsorbent layer 195, where a hydrocarbon adsorber 196 consisting of zeolite is mixed with a three-way catalyst 197 carrying precious metal, is layered on a cordierite honeycomb substratum 198.

Twelfth Embodiment

The twelfth embodiment will be described with reference to the diagram of FIGS. 56–60. The basic composition is similar of that as shown in FIGS. 1, 32. Therefore, the same structures are given the same reference characters as in FIGS. 1, 32, and the explanation is not repeated for the sake of brevity and clarity.

Referring to FIG. 56, a first pre-converter container 131 is connected to the downstream of an exhaust manifold 130 where exhaust gas from the #1 cylinder and the #4 cylinder gets together. Also, a second pre-converter container 132 is connected to the downstream of the an exhaust manifold 130 where exhaust gas from the #2 cylinder and the #3 cylinder gets together. A front tube 133 is connected to pre-converter containers 131, 132 respectively. The front tube 133 merges into one passage at its downstream side, and connects to the center tube 35. In pre-converter containers 131, 132, a sole honeycomb substratum 200 forming a combined catalytic-hydrocarbon adsorbent 199 is arranged respectively. A three-way catalytic converter 210 is formed on the upstream side of the honeycomb substrate 200. A combined catalytic-hydrocarbon adsorbent 211 is formed on the downstream of the honeycomb substratum 200.

FIG. 57 illustrates the upstream side of the three-way catalytic converter 210 enlarged scale in view of exhaust gas flow. A three-way catalytic layer 201 (three-way catalyst) carrying precious metal is layered on the upstream side of the honeycomb substratum 200. The three-way catalytic layer 201 preferably includes palladium for light off catalytic conversion. As another variation, an oxidation catalytic converter can be applied instead of the three-way catalytic converter.

FIG. 58 illustrates the downstream side of the combined catalytic-hydrocarbon adsorbent 211 on enlarged scale in view of exhaust gas flow. A hydrocarbon adsorbent layer 202 (hydrocarbon adsorber) consists of zeolite for an under layer and a three-way catalytic layer 203 (three-way catalyst) carrying precious metal for an over layer are layered on the downstream side of the honeycomb substratum 200.

Which such combined catalytic-hydrocarbon adsorbent 199, the three-way catalytic layer 201 exists on the upstream side of the combined catalytic-hydrocarbon adsorbent 199. Thus, hydrocarbons desorbed from the downstream side of the hydrocarbon adsorbent layer 202 flow backward by the action of the strong pulsing stream of the exhaust gas, then go through the three-way catalytic layer 201 exists on the upstream side of the combined catalytic-hydrocarbon adsorbent 199 again.

Especially, the first pre-converter container 131 positions at immediately downstream of a position where exhaust gas from the #1 cylinder and the #4 cylinder merges, and the second pre-converter container 132 positions at immediately downstream of a position where exhaust gas from the #2 cylinder and the #3 cylinder merges. Thus, the pulsing stream of the exhaust gas is kept strong at the point where the combined catalytic-hydrocarbon adsorbents 199 are arranged. On the other hand, the three-way catalytic layer 201 exists on the upstream side of the combined catalytic-hydrocarbon adsorbent 199 can reach its activation temperature before the hydrocarbon adsorbent layer 202 exists on the downstream side of the combined catalytic-hydrocarbon adsorbent 199 starts to desorb hydrocarbons. Thus, hydrocarbons desorbed from the downstream side of the hydrocarbon adsorbent layer 202 are oxidized with the three-way catalytic layer 201 exists on the upstream side of the combined catalytic-hydrocarbon adsorbent 199.

FIG. 59 illustrates another modification of the combined catalytic-hydrocarbon adsorbent 211. A catalytic-adsorbent layer 204, where a hydrocarbon adsorber 205 consisting of zeolite is mixed with a three-way catalyst 206 carrying precious metal, is layered on the downstream side of the honeycomb substratum 200.

FIG. 60 illustrates further another modification of the combined catalytic-hydrocarbon adsorbent 211. A hydrocarbon adsorbent layer 207 consisting of zeolite is layered on the downstream side of the honeycomb substratum 200 for an under layer. A catalytic-adsorbent layer 208, where a hydrocarbon adsorber 209 consisting of zeolite is mixed with a three-way catalyst 210 carrying precious metal, is layered on the hydrocarbon adsorbent layer 207 for an over layer.

The contents of Tokugan Hei 10-150274, with a filing date of May 29, 1998 in Japan, is hereby incorporated by reference in its entirety including the title, abstract, specification, drawings and claims.

Although the invention has been described in its present preferred form with a certain degree of particularity, it is understood that the spirit and the scope of the invention is not limited to the embodiments described above.

We claim:

1. An exhaust gas purification apparatus in a multi-cylinder combustion engine, comprising:
   an exhaust manifold to merge exhaust gas discharged from each cylinder such that the respective exhaust gas discharged from each cylinder meets at a merging point in the exhaust manifold;
   a hydrocarbon adsorbent that adsorbs hydrocarbon at a lower temperature and desorbs hydrocarbon at a higher temperature, disposed in the exhaust manifold; and
   a catalytic converter disposed in the exhaust manifold at a position upstream from the hydrocarbon adsorbent that purifies hydrocarbon wherein the catalytic converter and the hydrocarbon adsorbent being arranged adjacent to each other in series immediately downstream of the merging point at a distance whereby the hydrocarbons desorbed from the hydrocarbon absorbent flow backward in the direction of the catalytic converter by a pulsing stream of the exhaust gas.

2. An exhaust gas purification apparatus in a multi-cylinder combustion engine as defined in claim 1, wherein the exhaust manifold includes a container that holds the hydrocarbon adsorbent and the catalytic converter.

3. An exhaust gas purification apparatus in a multi-cylinder combustion engine as defined in claim 1, wherein the hydrocarbon adsorbent carries a three-way catalyst and a hydrocarbon adsorber.

4. An exhaust gas purification apparatus in a multi-cylinder combustion engine as defined in claim 1, wherein the hydrocarbon adsorbent carries a hydrocarbon adsorber for an under-layer and a three-way catalyst for an overlayer.

5. An exhaust gas purification apparatus in a multi-cylinder combustion engine as defined in claim 1, wherein the hydrocarbon adsorbent carries a hydrocarbon adsorber which is mixed with a three-way catalyst.

6. An exhaust gas purification apparatus in a multi-cylinder combustion engine as defined in claim 1, wherein a three-way catalyst for the catalytic converter and a hydrocarbon adsorber for the hydrocarbon adsorber are formed on a common substratum.

7. An exhaust gas purification apparatus in a multi-cylinder combustion engine as defined in claim 6, wherein the three-way catalyst is layered on an upstream side of the substratum, and the hydrocarbon adsorber is layered on a downstream side of the substratum.

8. An exhaust gas purification apparatus in a multi-cylinder combustion engine as defined in claim 1, wherein a three-way catalyst and a hydrocarbon adsorber for the catalytic converter are layered on an upstream side of a substratum, and a three-way catalyst and a hydrocarbon adsorber for the hydrocarbon adsorbent are layered on a downstream side of the substratum.

9. An exhaust gas purification apparatus in a multi-cylinder combustion engine as defmed in claim 1, wherein the catalytic converter includes a first substratum on which a catalyst is layered, the hydrocarbon adsorbent includes a second substratum on which a hydrocarbon adsorber is layered, and wherein a thickness of the first substratum is thinner than a thickness of the second substratum.

10. An exhaust gas purification apparatus in a multi-cylinder combustion engine as defined in claim 9, wherein the first substratum has a cell density that is larger than the cell density of the second substratum.

11. An exhaust gas purification apparatus in a multi-cylinder combustion engine as defined in claim 1, further comprising:
a further catalytic converter located at position downstream from the hydrocarbon adsorbent and the catalytic converter.

12. An exhaust gas purification apparatus in a multi-cylinder combustion engine, comprising:
an exhaust passage to merge exhaust gas discharged from each cylinder such that the respective exhaust gas discharged from each cylinder meets at a merging point in the exhaust passage;
a hydrocarbon adsorbent disposed in the exhaust passage; and
a catalytic converter disposed in the exhaust passage at a position upstream from the hydrocarbon adsorbent, wherein the catalytic converter and the hydrocarbon adsorbent are arranged adjacent to each other in series and the catalytic converter and the hydrocarbon adsorbent being arranged immediately downstream of the merging point at a distance whereby the hydrocarbons desorbed from the hydrocarbon absorbent flow backward in the direction of the catalytic converter by a pulsing stream of the exhaust gas.

13. An exhaust gas purification apparatus in a multi-cylinder combustion engine as defined in claim 12, wherein an exhaust manifold defines a part of the exhaust passage, and the catalytic converter and the hydrocarbon adsorbent are disposed in the exhaust manifold.

14. An exhaust gas purification apparatus in a multi-cylinder combustion engine as defined in claim 13, wherein the exhaust manifold has a container, and the container holds the hydrocarbon sorbent and the catalytic converter.

15. An exhaust gas purification apparatus in a multi-cylinder combustion engine as defined in claim 12, wherein an exhaust manifold and a container define a part of the exhaust passage, and wherein the container is connected to a downstream portion of the exhaust manifold, and wherein the container holds the hydrocarbon adsorbent and the catalytic converter.

16. An exhaust gas purification apparatus in a multi-cylinder combustion engine as defined in claim 12, wherein the catalytic converter carries a three-way catalyst.

17. An exhaust gas purification apparatus in a multi-cylinder combustion engine as defined in claim 12, wherein the catalytic converter carries an oxidation catalyst.

18. An aust gas purification apparatus in a multi-cylinder combustion engine as defined in claim 12, wherein the hydrocarbon adsorbent carries a three-way catalyst and a hydrocarbon adsorber.

19. An exhaust gas purification apparatus in a multi-cylinder combustion engine as defmed in claim 12, wherein the hydrocarbon adsorbent carries an oxidation catalyst and a hydrocarbon adsorber.

20. An exhaust gas purification apparatus in a multi-cylinder combustion engine as defined in claim 12, wherein the hydrocarbon adsorbent carries a hydrocarbon adsorber for an under-layer and a three-way catalyst for an over-layer.

21. An exhaust gas purification apparatus in a multi-cylinder combustion engine as defined in claim 12, wherein the hydrocarbon adsorbent carries a hydrocarbon adsorber mixed with a three-way catalyst.

22. An exhaust gas purification apparatus in a multi-cylinder combustion engine as defined in claim 12, wherein a three-way catalyst for the catalytic converter and a hydrocarbon adsorber the hydrocarbon adsorber are formed on a common substratum.

23. An exhaust gas purification apparatus in a multi-cylinder combustion engine as defined in claim 22, wherein the three-way catalyst is layered on an upstream side of the substratum, and the hydrocarbon adsorber is layered on a downstream side of the substratum.

24. An exhaust gas purification apparatus in a multi-cylinder combustion engine as defined in claim 12, wherein a three-way catalyst for the catalytic converter is layered on an upstream side of a substratum, and a hydrocarbon adsorber and a three-way catalyst for the hydrocarbon adsorbent are layered on a downstream side of the substratum.

25. An exhaust gas purification apparatus in a multi-cylinder combustion engine as defined in claim 12, wherein a three-way catalyst and a hydrocarbon adsorber for the catalytic converter are layered on an upstream side of a substratum, and a three-way catalyst and a hydrocarbon adsorber for the hydrocarbon adsorbent are layered on a downstream side of the substratum.

26. An exhaust gas purification apparatus in a multi-cylinder combustion engine as defined in claim 12, wherein the catalytic converter includes a first substratum on which a catalyst is layered, the hydrocarbon adsorbent includes a second substratum on which a hydrocarbon adsorber is layered, and wherein a thickness of the first substratum is thinner than a thickness of the second substratum.

27. An exhaust gas purification apparatus in a multi-cylinder combustion engine as defined in claim 26, wherein the first substratum has a cell density that is larger than the cell density of the second substratum.

28. An exhaust gas purification apparatus in a multi-cylinder combustion engine as defined in claim 12, wherein an exhaust manifold defines a part of the exhaust passage, and wherein the exhaust manifold merges exhaust gas discharged from a group of cylinders where combustion order is mutually nonconsecutive.

29. An exhaust gas purification apparatus in a multi-cylinder combustion engine as defined in claim 28, wherein the exhaust manifold includes a container in the vicinity of a merging point where exhaust gas discharged from the group of the cylinders merges, and wherein the container holds the catalytic converter and the hydrocarbon adsorbent.

30. An exhaust gas purification apparatus in a multi-cylinder combustion engine as defined in claim 28, wherein a container defines a part of the exhaust passage, the container being concted to the exhaust manifold in the vicinity of a merging point where exhaust gas discharged from the group of the cylinders merges, and wherein the container holds the hydrocarbon adsorbent and the catalytic converter.

31. An exhaust gas purification apparatus in a multi-cylinder combustion engine, comprising;
an exhaust manifold that merges exhaust gas discharged from a first group of the cylinders in a first place, and merges exhaust gas discharged from a second group of the cylinders in a second place respectively;
a first catalytic converter and a first hydrocarbon adsorbent disposed immediately downstream of a first merging point at a distance whereby the hydrocarbons desorbed from the first hydrocarbon adsorbent flow backward in the direction of the first catalytic converter by a pulsing stream of the exhaust gas, said first merging point being where respective exhaust gas discharged from the first group of the cylinders merges in the first place, wherein the first catalytic converter and the first hydrocarbon adsorbent are arranged adjacent to each other in series, and wherein the first catalytic converter is arranged at a position upstream from the first hydrocarbon adsorbent; and
a second catalytic converter and a second hydrocarbon adsorbent disposed immediately downstream of a second merging point at a distance whereby the hydrocarbons desorbed from the second hydrocarbon adsorbent flow backward in the direction of the second catalytic converter by a pulsing stream of the exhaust gas, said second merging point being where respective exhaust gas discharged from the second group of the cylinders merges in the second place, wherein the second catalytic converter and the second hydrocarbon adsorbent are arranged adjacent to each other in series, and wherein the second catalytic converter is arranged at a position upstream from the second hydrocarbon adsorbent.

32. An exhaust gas purification apparatus in a multi-cylinder combustion engine as defined in claim 31, wherein the exhaust manifold merges exhaust gas discharged from a first group of the cylinders where combustion order is mutually nonconsecutive, and merges exhaust gas discharged from a second group of the cylinders where combustion order is mutually nonconsecutive.

33. An exhaust gas purification apparatus in a multi-cylinder combustion engine as defined in claim 31, wherein the first catalytic converter and the first hydrocarbon adsorbent are disposed in the exhaust manifold.

34. An exhaust gas purification apparatus in a multi-cylinder combustion engine as defined in claim 33, wherein the second catalytic converter and the second hydrocarbon adsorbent are disposed in the exhaust manifold.

35. An exhaust gas purification apparatus in a multi-cylinder combustion engine as defined in claim 31, wherein a first container is connected to the exhaust manifold in the vicinity of the first merging point where exhaust gas discharged from the first group of the cylinders merges, and wherein the first container holds the first catalytic converter and the first hydrocarbon adsorbent.

36. An exhaust gas purification apparatus in a multi-cylinder combustion engine as defined in claim 35, wherein a second container is connected to the exhaust manifold in the vicinity of the second merging point where exhaust gas discharged from the second group of the cylinders merges, and wherein the second container holds the second catalytic converter and the second hydrocarbon adsorbent.

37. An exhaust gas purification apparatus in a multi-cylinder combustion engine as defined in claim 31, wherein cylinders are aligned in the order of #1, #2 #3 and #4, wherein combustion occurs in the order of #1, #3, #4 and #2, and wherein the first group of cylinders is defined as the #1 and #4 cylinders, and the second group of cylinders is defined as the #2 and #3 cylinders.

38. An exhaust gas purification apparatus in a multi-cylinder combustion engine as defined in claim 31, wherein cylinders a first bank of cylinders are aligned in the order of #1, #3 and #5, and a second bank of cylinders are aligned in the order of #2, #4 and #6, wherein combustion occurs in the order of #1, #2, #3,#4, #5 and #6, and wherein the first group of cylinders is defined as the #1, #3 and #5 cylinders, and the second group of cylinders is defined as the #2, #4 and #6 cylinders.

39. An exhaust gas purification apparatus for use in a multi-cylinder combustion engine, comprising:
an exhaust manifold to merge exhaust gas discharged from one cylinder with exhaust gas discharged from another cylinder at a merging point in the exhaust manifold;
a hydrocarbon absorbent disposed in the exhaust manifold; and
a catalytic converter disposed in the exhaust passage at a position upstream from the hydrocarbon absorbent, wherein the catalytic converter and the hydrocarbon absorbent are arranged adjacent to each other in series, and wherein
the catalytic converter and the hydrocarbon absorbent being arranged immediately downstream of the merging point at a distance whereby the hydrocarbons desorbed from the hydrocarbon absorbent flow backward in the direction of the catalytic converter by a pulsing stream of the exhaust gas.

* * * * *